M. H. LOCKWOOD.
WRITING AND ADDING MACHINE.
APPLICATION FILED MAR. 16, 1904.
940,037.
Patented Nov. 16, 1909.
12 SHEETS—SHEET 8.
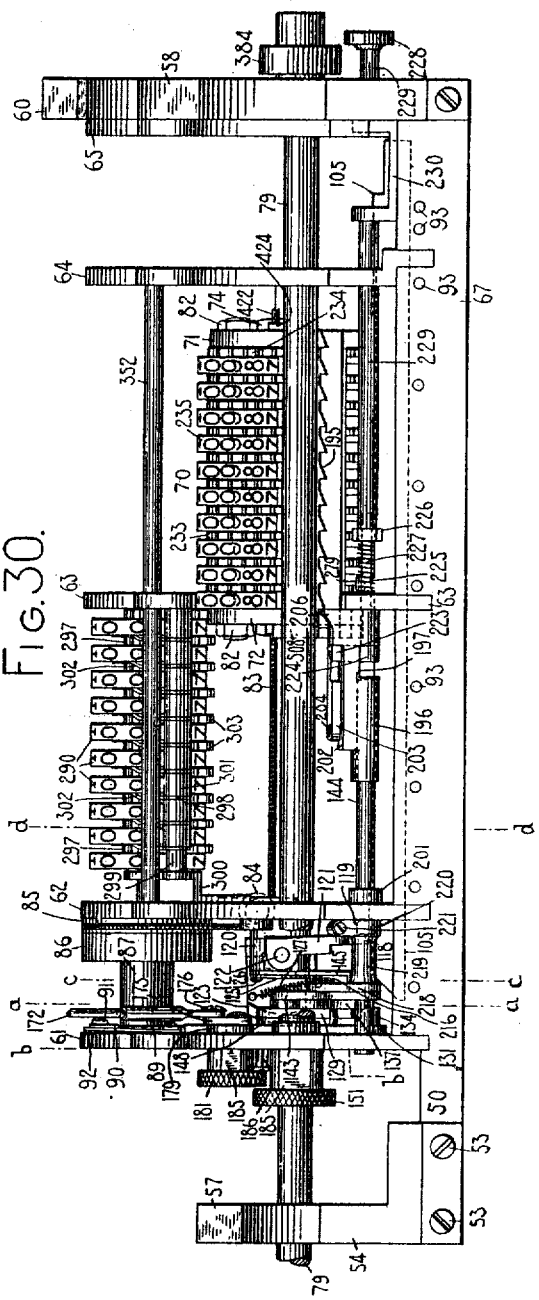
WITNESSES:
K. V. Donovan.
R. H. Strother.
INVENTOR:
Marquis H. Lockwood
by Jacob Felbel
HIS ATTORNEY

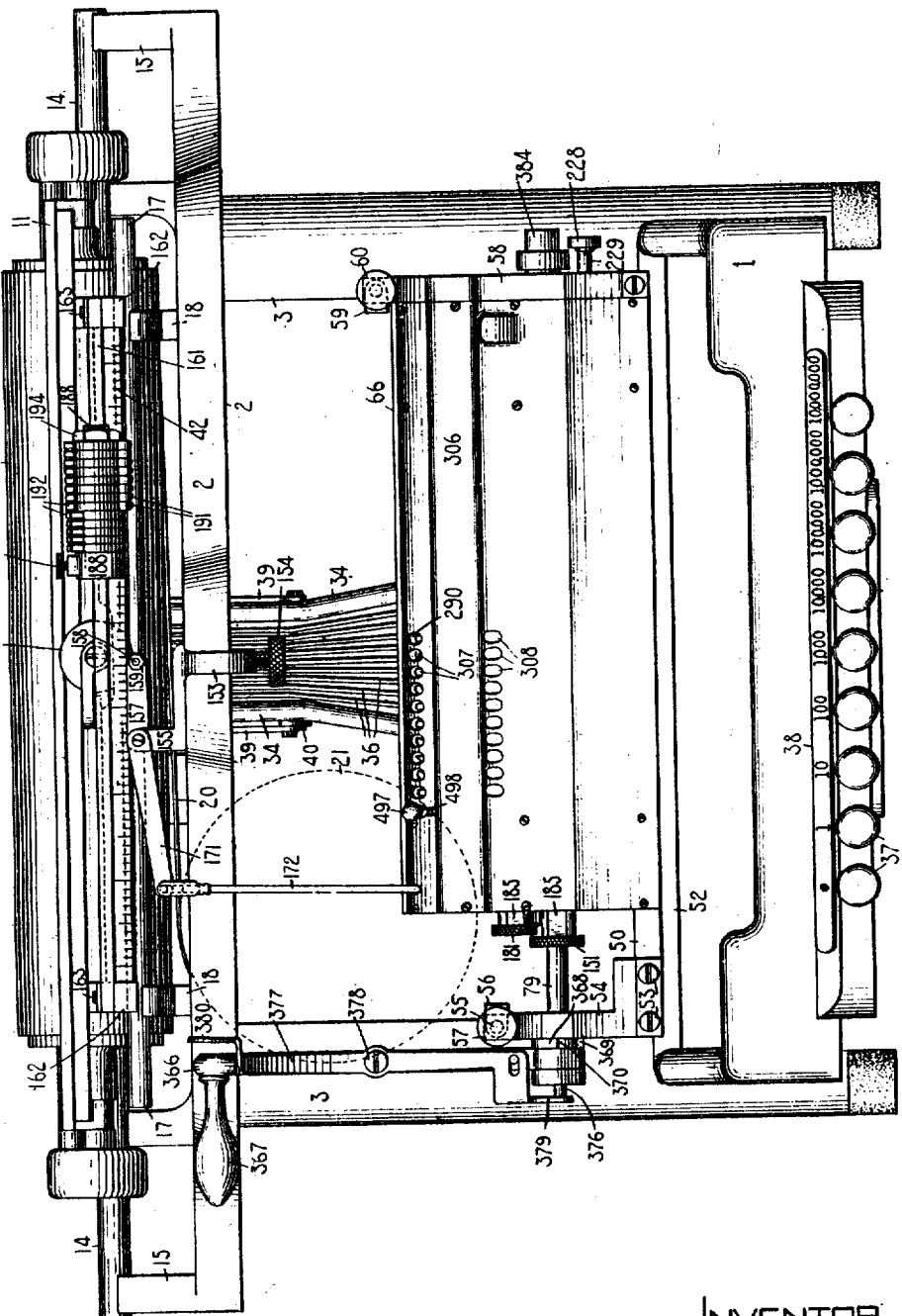

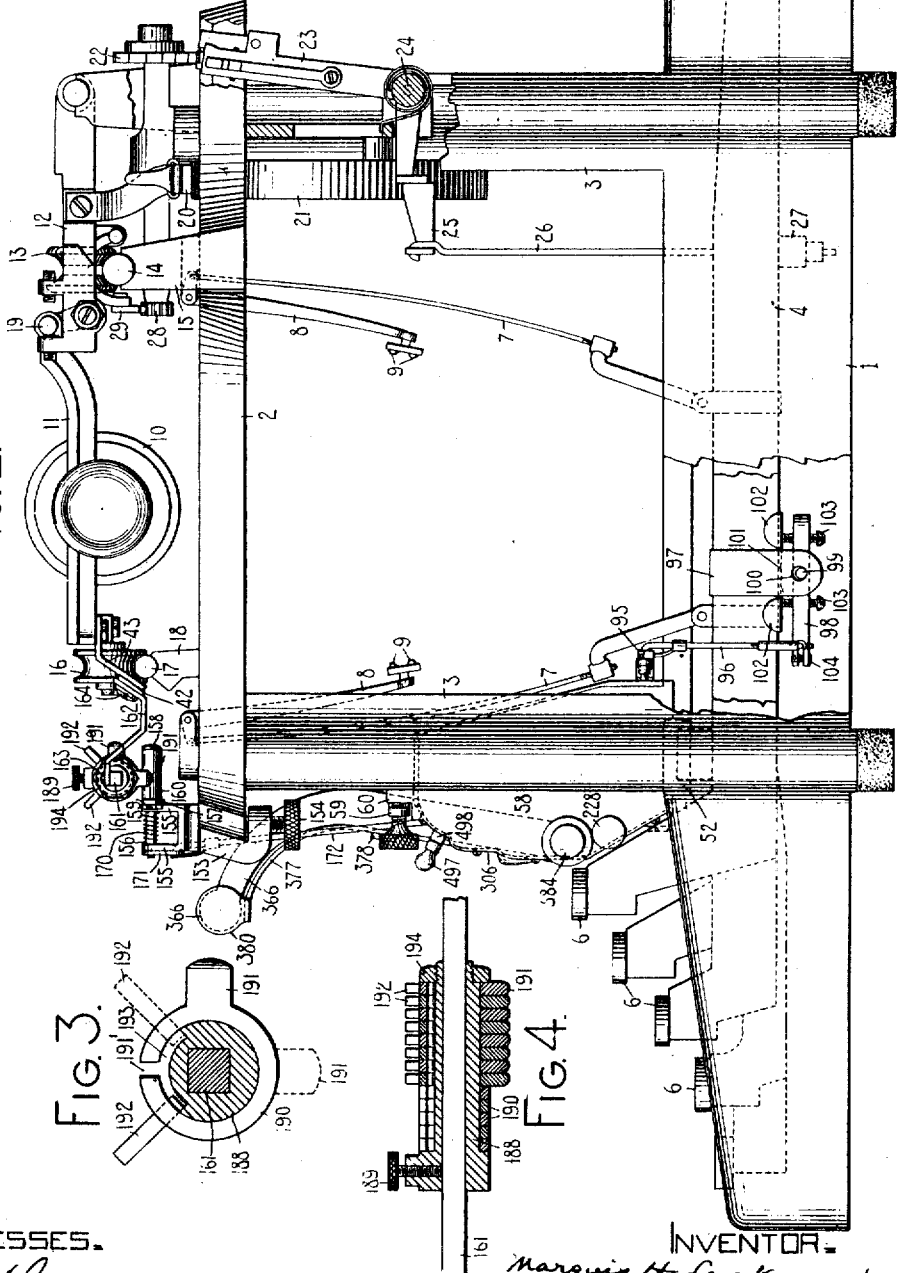

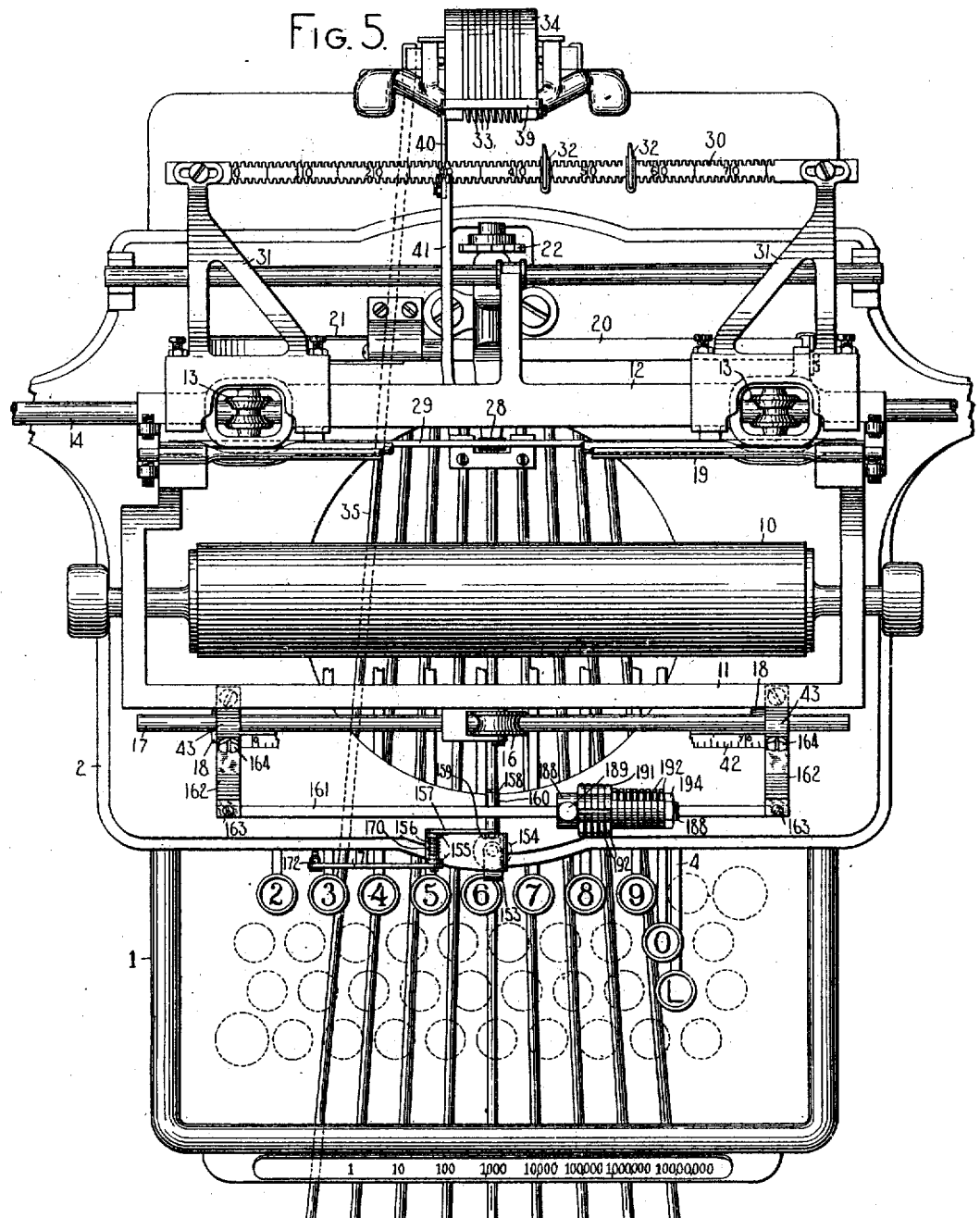

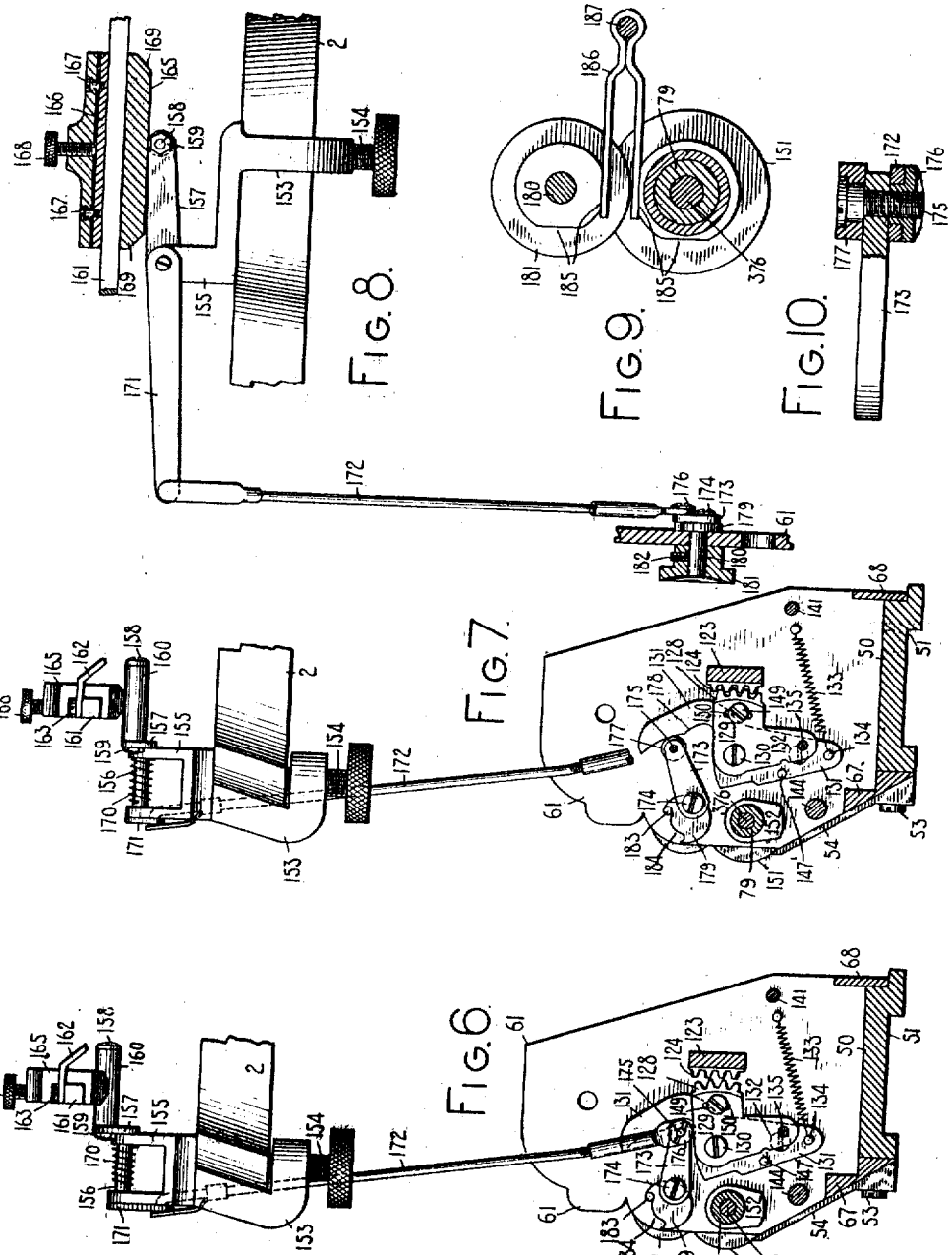

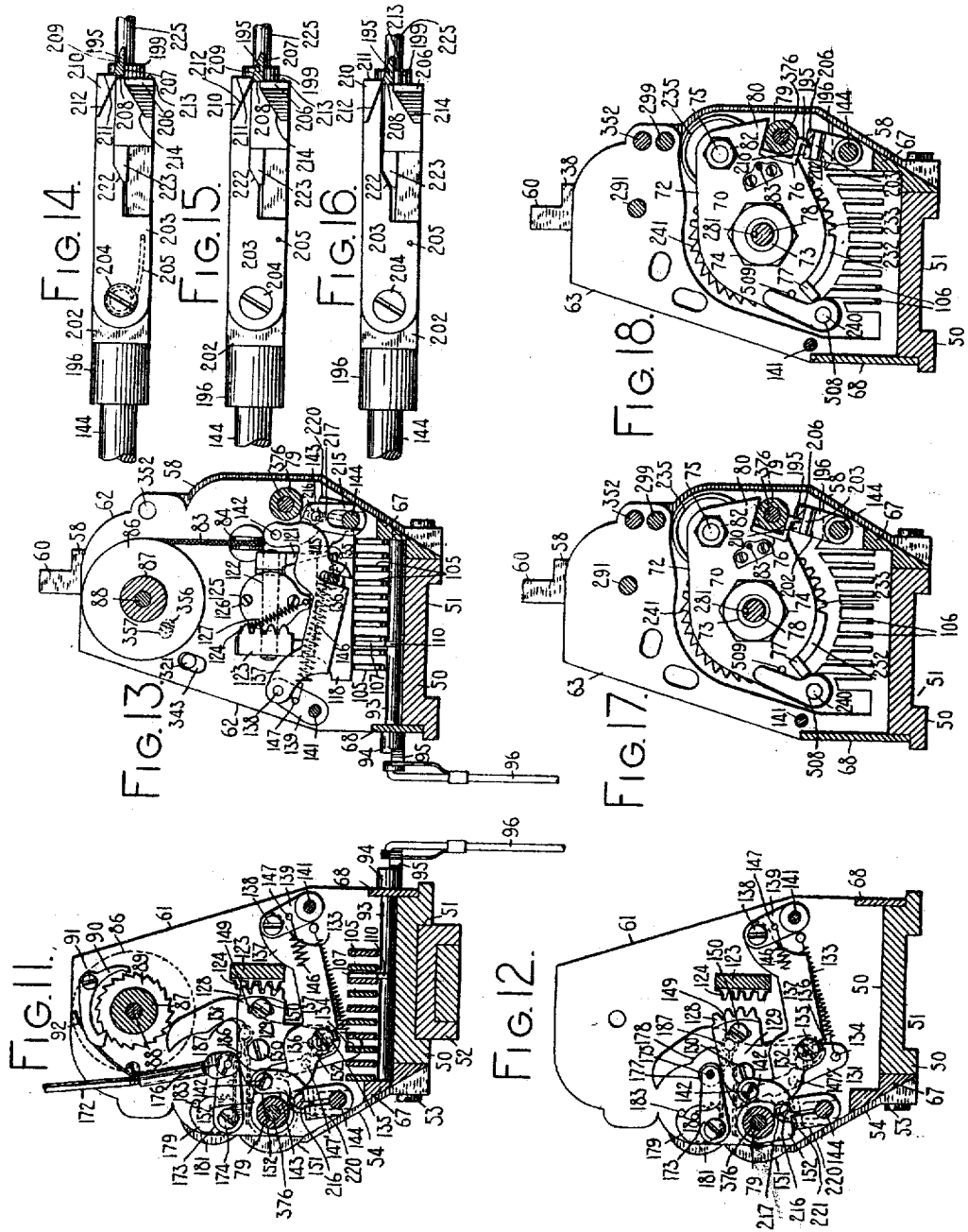

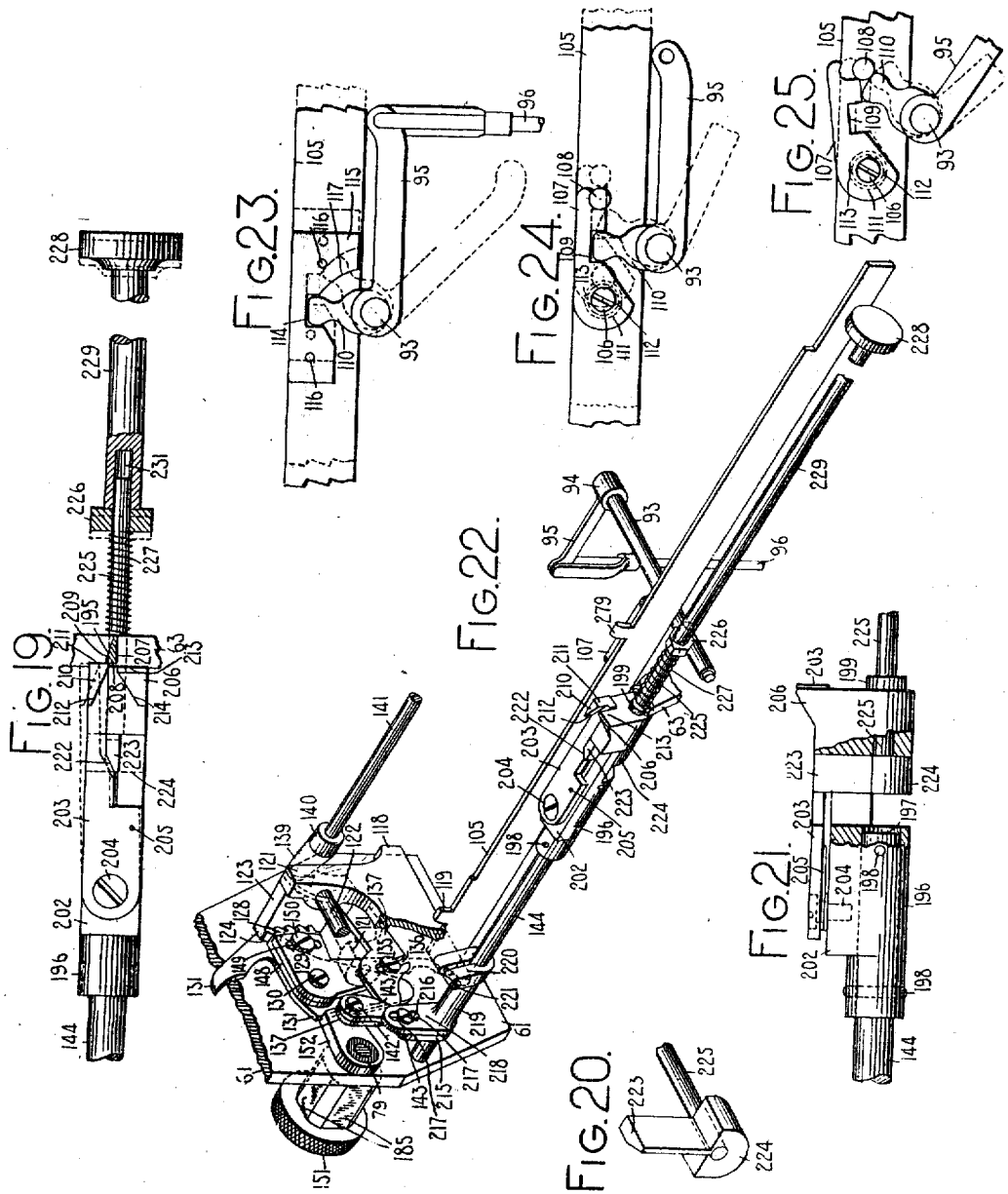

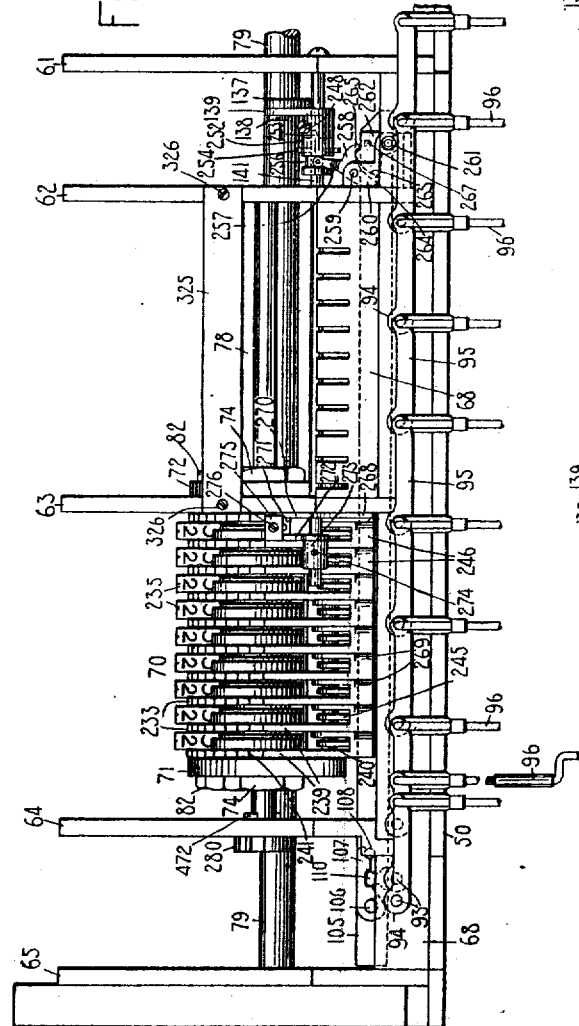

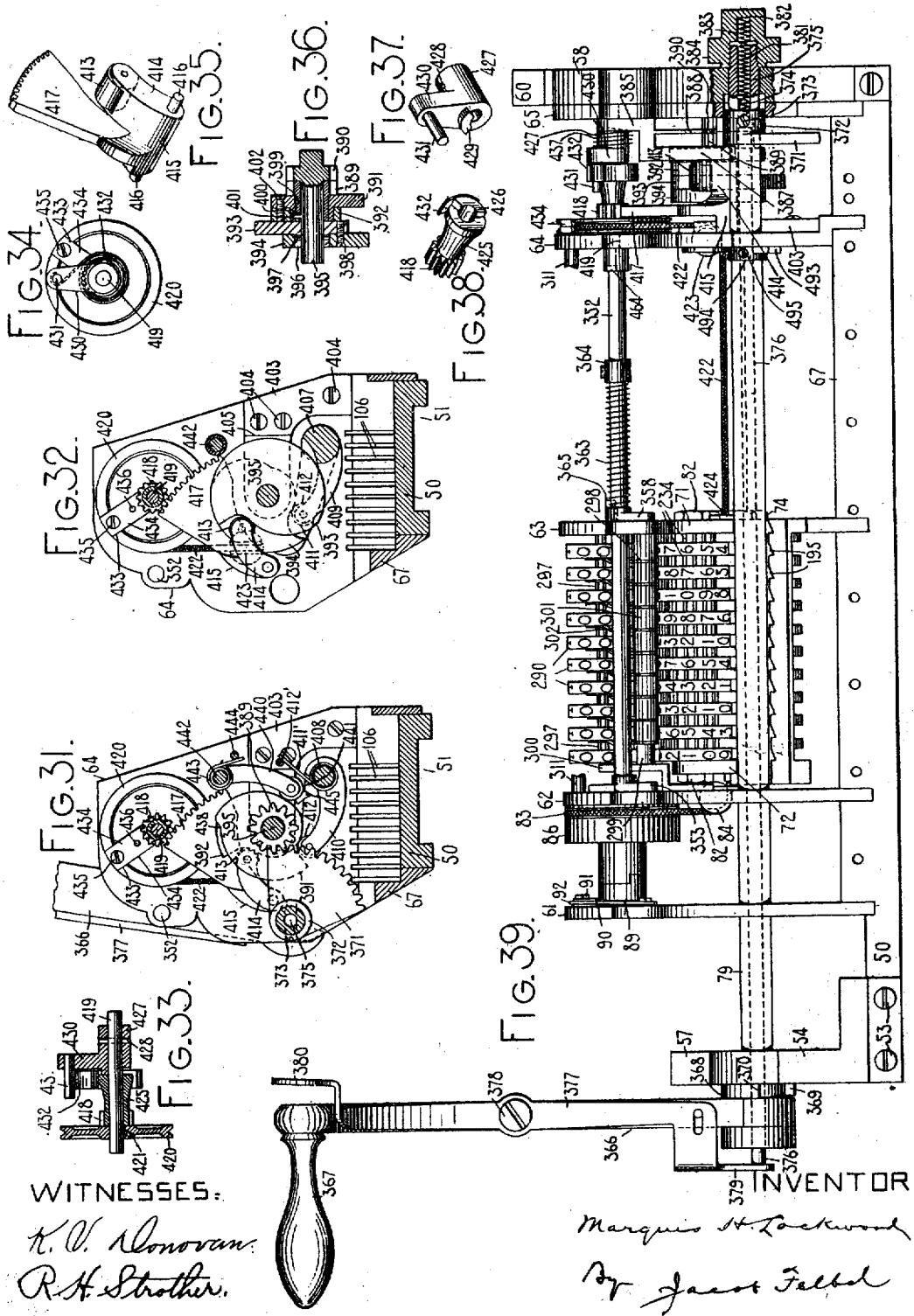

M. H. LOCKWOOD.
WRITING AND ADDING MACHINE.
APPLICATION FILED MAR. 16, 1904.
940,037.
Patented Nov. 16, 1909.
12 SHEETS—SHEET 10.
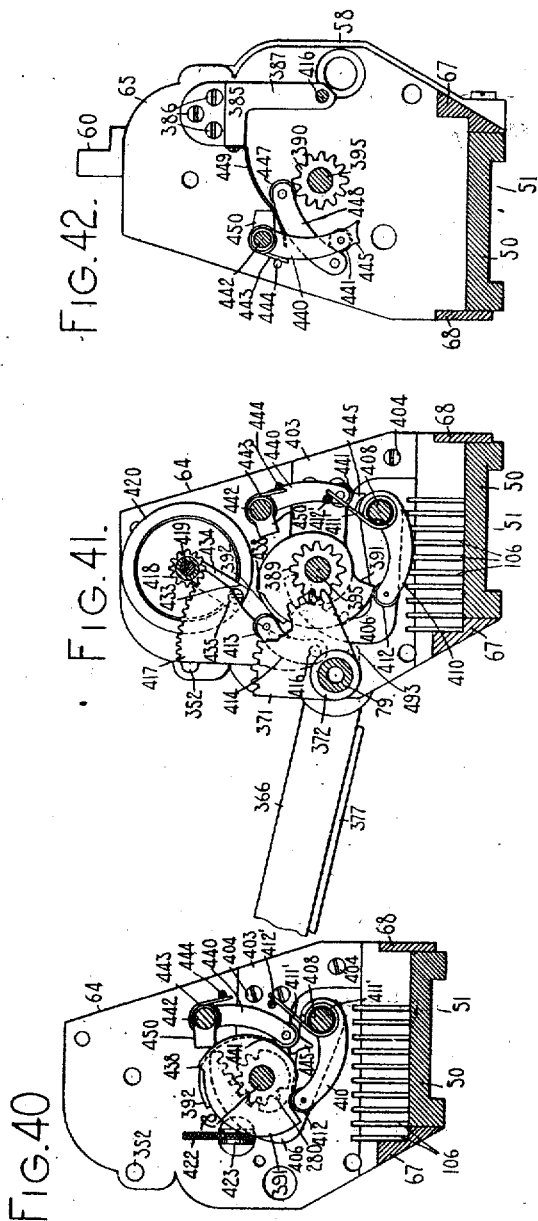
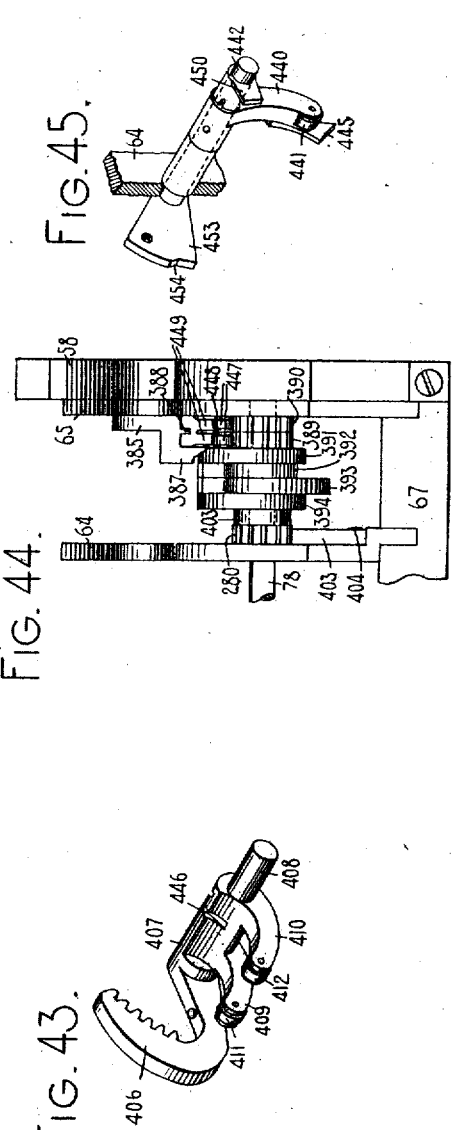
WITNESSES.
K. V. Donovan.
R. H. Strother.
INVENTOR:
Marquis H. Lockwood
By Jacob Felbel
HIS ATTORNEY M. H. LOCKWOOD.
WRITING AND ADDING MACHINE.
APPLICATION FILED MAR. 16, 1904.
940,037.
Patented Nov. 16, 1909.
12 SHEETS—SHEET 11.
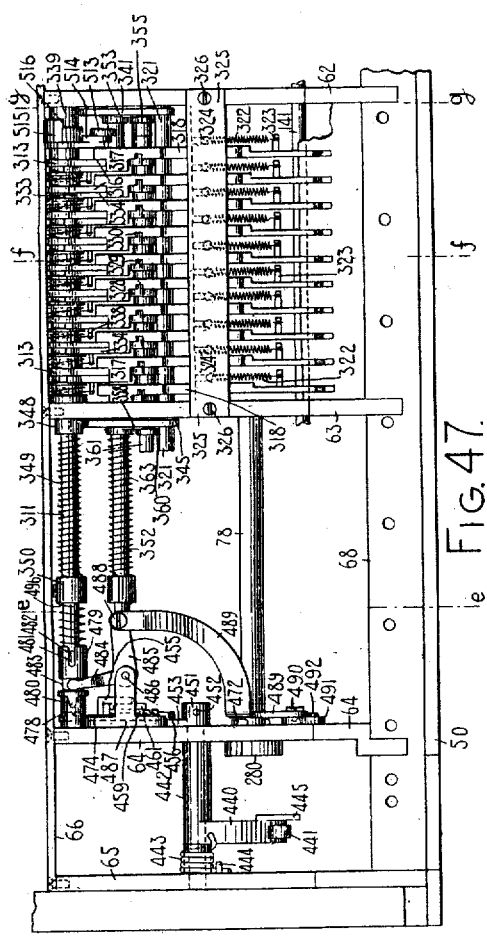
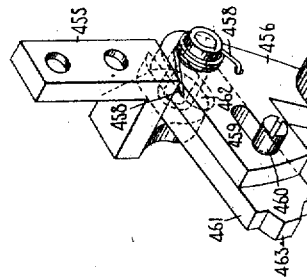
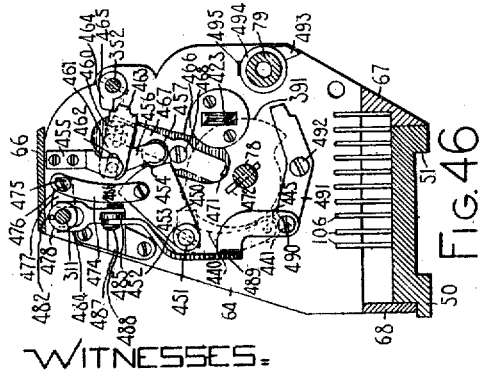
WITNESSES:
K. V. Donovan.
R. H. Strother.
INVENTOR:
Marquis H. Lockwood
by
Jacob Felbel
HIS ATTORNEY

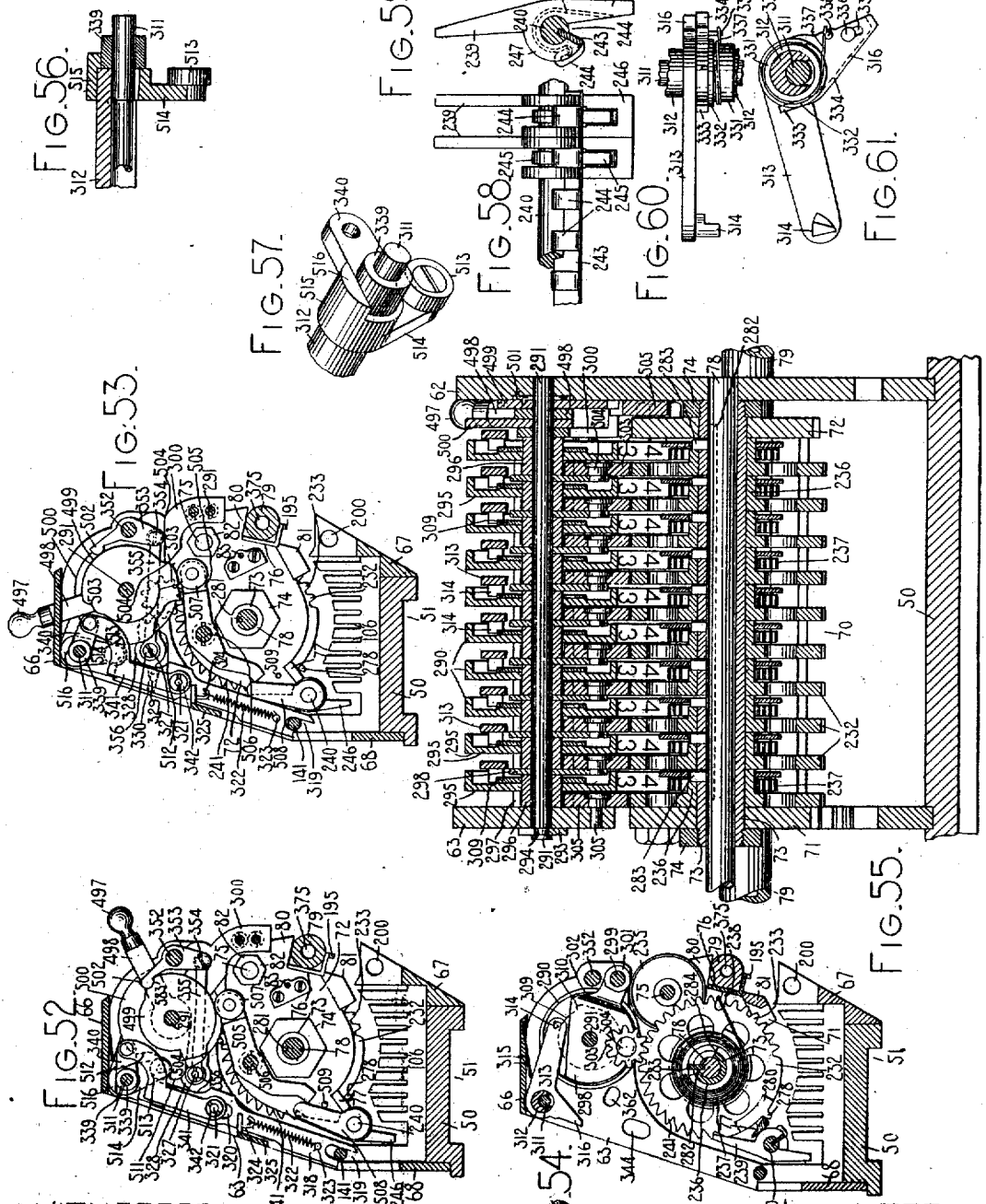

UNITED STATES PATENT OFFICE.

MARQUIS HARTWELL LOCKWOOD, OF NEW YORK, N. Y., ASSIGNOR TO UNION TYPEWRITER COMPANY, OF JERSEY CITY, NEW JERSEY, A CORPORATION OF NEW JERSEY.

WRITING AND ADDING MACHINE.

940,037.      Specification of Letters Patent.      Patented Nov. 16, 1909.

Application filed March 16, 1904. Serial No. 198,333.

*To all whom it may concern:*

Be it known that I, MARQUIS HARTWELL LOCKWOOD, citizen of the United States, and resident of the borough of Manhattan, city of New York, in the county of New York and State of New York, have invented certain new and useful Improvements in Writing and Adding Machines, of which the following is a specification.

My invention relates principally to adding machines.

My invention relates also to combined writing and adding machines and has for its object the provision of an improved machine of this character.

My invention consists in certain parts, improvements and combinations which will be fully set forth herein and particularly pointed out in the claims.

In the accompanying drawings, I have illustrated one embodiment of my invention wherein an adding mechanism is connected to a Remington No. 6 typewriting machine in such manner as to automatically add numbers written by said typewriting machine, the adding mechanism being in the nature of an attachment to the typewriting machine.

In said drawings, Figure 1 is a front elevation of the machine, the typewriter keys being omitted. Fig. 2 is an end elevation of the machine. Fig. 3 is a detail view in cross section of a certain contact device used in my construction. Fig. 4 is a longitudinal section of the same. Fig. 5 is a plan view of the machine. Figs. 6 and 7 are views in elevation showing the connection between the adding mechanism and the typewriter carriage, the parts being shown in different positions in said views. In these figures the adding mechanism is shown in section on the line *a—a* of Fig. 30. Fig. 8 is a front elevation of the carriage connections shown in Figs. 6 and 7. The contact device on the typewriter carriage shown in Figs. 6, 7 and 8, is a modification, the preferred form being shown in Figs. 1 to 5 inclusive. Fig. 9 is a detail view in vertical section on the line *b—b* of Fig. 30. Fig. 10 illustrates a detail. Fig. 11 is a sectional view of the adding mechanism taken substantially on line *c—c* of Fig. 30, and looking to the left. Fig. 12 is a view similar to Fig. 11, some of the parts being omitted and others being shown in a different position. Fig. 13 is a view in vertical section nearly on the line *a—a* of Fig. 30, and looking toward the right. Figs. 14, 15 and 16 are detail views of an escapement mechanism, the parts being shown in different positions in the different views. Figs. 17 and 18 are views in vertical section substantially on a line *d—d* of Fig. 30, the escapement mechanism being shown in different positions in the two figures. Figs. 19, 20 and 21 are detail views of parts of the escapement mechanism. Fig. 22 is an isometric view of the universal bar and parts associated therewith. Fig. 23 is a fragmentary view in elevation showing one form of key connection. Figs. 24 and 25 are similar views of a preferred form of key connections, the parts being shown in different positions in the two views. Fig. 26 is a rear elevation of the adding mechanism. Figs. 27, 28 and 29 are detail views showing parts connected to the zero numeral key. Fig. 30 is a front elevation of the adding mechanism. Fig. 31 is an irregular vertical sectional view taken just inside the right hand end frame piece, and showing parts of the operating mechanism. Fig. 32 is a similar view but with some of the parts shown in Fig. 31 sectioned away. Figs. 33, 34, 35, 36, 37 and 38 are detail views of parts of the operating mechanism. Fig. 39 is a front elevation of the adding mechanism. Fig. 40 is a view similar to Fig. 31 but showing some parts not shown in said Fig. 31. Fig. 41 is a view similar to Fig. 31 but showing the cams in operated position. Figs. 42, 43, 44 and 45 are views illustrating details of the operating mechanism. Fig. 46 is a view in vertical section on the line *e—e* of Fig. 47 looking toward the left. Fig. 47 is a rear elevation. Figs. 48 and 49 are enlarged detail views of parts shown in Figs. 46 and 47. Fig. 50 is a view in vertical section on the line *e—e* of Fig. 47 and looking toward the right in said figure. Fig. 51 is a view in vertical section on the line *f—f* of Fig. 47 and looking toward the right in said figure. Fig. 52 is a view in vertical section on the line *g—g* of Fig. 47 looking toward the left. Fig. 53 is a view similar to Fig. 52 but showing the parts in a different position. Fig. 54 is a view in vertical section on substantially the same line as Fig. 51 but looking in the opposite direction.

Fig. 55 is a sectional view substantially on the line h—h of Fig. 50, and looking toward the front of the machine. Figs. 56, 57, 58, 59, 60 and 61 are detail views of portions of the adding mechanism.

In most of the figures of the drawing some parts are omitted and others are shown broken away.

I have shown my adding mechanism attached to an ordinary Remington No. 6 typewriting machine. The frame of this machine comprises a base 1 and a top plate 2 connected to said base by posts 3. The key levers 4 are fulcrumed near their rear ends beneath a flange 5 and are provided upon their front ends with the character keys 6. The key levers 4 are connected by links 7 with pivoted type bars 8 and each of said type bars has upon its free end two types 9. When any key is depressed its type bar is thrown upward against the paper carried by a platen 10 mounted in a platen frame 11 which is connected to a carriage truck 12. Said truck is provided with traverse rollers 13 running on a rail 14 which is mounted on posts 15 rising from the top plate 2. The platen frame 11 has at the front thereof a roller 16 which runs on a rail 17 supported by posts 18. The posts 18 are movably supported on the framework of the machine and are connected to devices for imparting a case shift motion to the platen frame. These devices are not here shown but are well-known in the art. The platen frame 11 is pivoted to the rod 19 so that the frame may be raised to bring the writing into view. The carriage is normally drawn to the left by a band 20 running over a spring drum 21 in the usual manner and the motion of the carriage under the impulse of said spring drum is controlled by an escapement mechanism comprising an escapement wheel 22 controlled by dogs mounted on a rocker frame 23 which is pivoted at 24 and is provided with forwardly extending arms 25 which are connected by links 26 with a universal bar 27 running under the keys in the usual manner. The escapement wheel 22 is on one end of a shaft which carries at its other end a pinion 28 which meshes with a rack 29 mounted on the carriage. The construction is such that as the character keys are depressed one after another a step-by-step motion is imparted to the carriage.

In many cases where numbers are to be written on the typewriting machine and automatically added, the numbers to be added are written in columns, and this work is greatly facilitated by the use of a denominational tabulator. Any tabulator mechanism may be used for this purpose. The one which I have here shown is well-known in the art as the "Gorin" tabulator. A bar 30 (Fig. 5) is supported on the truck 12 by means of two arms or brackets 31 extending backward from said truck. The bar 30 is rectangular in cross-section and its two vertical faces are formed with series of teeth, the pitch of which corresponds to the pitch of the letter space rack 29. Stops 32 are held in place on the bar 30 by the teeth of said bar, the notches between successive teeth corresponding to the several letter space positions of the carriage. The stops 32 may be placed in any of the notches of the series. Said stops 32 coöperate with denomination stops 33 movably supported in the framework 34 which is secured to the frame of the typewriting machine. The stop surfaces of the successive denomination stops 33 are a letter space distance apart, and each of said denomination stops is operatively connected with push rods 35 (Fig. 5) extending from front to back of the machine between the key levers, by one of a series of levers 36 (Fig. 1) pivoted in the frame 34. Each of the rods 35 has on its front end a push key 37 (Figs. 1 and 5). Each of the keys 37 corresponds to a denominational position of the carriage as indicated by a scale 38 arranged above said keys. The denomination stops 33 control a universal bar 39 (Fig. 5) which is pivotally connected to the frame 34 and has connected thereto an arm 40 which in turn is connected to a lever 41 which extends forward under the feed rack 29. The construction is such that when any tabulator key 37 is pushed in, the corresponding denomination stop 33 will be projected into the path of the carriage stop 32 and will operate the universal bar 39 which, through the lever 41, raises the rack 29 out of engagement with its pinion 28, thus freeing the carriage, which is drawn by the spring drum 21 until arrested in the denominational position corresponding to the tabulator key operated by the carriage stop 32 striking the denomination stop 33. A carriage scale 42 is supported at its ends by brackets 43 secured to the front portion of the platen frame 11. An index (not shown) coöperates with this scale. The tabulator bar 30 has its notches numbered to correspond with the scale 42 as shown in Fig. 5.

The parts thus far described are old and well-known.

My adding mechanism is secured to the framework of the typewriting machine between the two front posts 3. The frame of this mechanism includes a bottom plate 50 which is formed on its underside with a shallow groove or longitudinal recess 51 which receives a frame bar 52 which extends across the typewriting machine above the key levers 4 and connects the two front posts 3 of said machine (see Figs. 1, 2 and 11). The frame piece 50 has secured to the left hand end thereof, as by screws 53, a vertical frame piece 54. The rear edge of said frame piece 54 rests against the front face of the left hand post 3 and said frame piece is clamped to said post by a clamping screw 55 threaded into a U-shaped clamping piece 56. One arm of the clamp piece 56 extends back of the post 3 and the other arm thereof extends in front of a perpendicular reduced portion 57 of the frame piece 54 (see Fig. 1). Another vertical frame piece 58 is secured to the plate 50 at the right hand end thereof and the rear edge of said plate 58 rests against the front face of the right hand post 3 to which it is secured by a clamp 59 similar to that on the other side of the machine. The clamps 56 and 59 are readily removable and when they are removed the framework of the adding mechanism is no longer fastened to the framework of the typewriting machine. The clamp 59 engages a reduced portion 60 (see Fig. 13) of the frame plate 58, said reduced portion being similar to that of the plate 54 at the other end of the machine. Five partitions 61, 62, 63, 64 and 65 rise from the base plate 50 and support most of the adding mechanism. These partitions are connected together at the top by a frame plate 66 which is shown, for example, in Figs. 46 and 47, but which is omitted from many of the views of the drawings. There is a strip of metal 67 extending longitudinally of the machine in front thereof and another strip 68 at the back. These strips are secured to the base plate 50 and said base plate and the strips are slotted to receive the partitions 61, 62, 63, 64 and 65. It will be observed by reference to Fig. 2 that the outline of the adding mechanism in cross-section has been made to conform to the space between the links 7 and the back row of key levers 4.

I employ a setting-up and indicating mechanism which is mounted in a carriage 70. The left hand end of this carriage is shown in Figs. 17 and 18 and the right hand end in Fig. 50. The carriage is shown in front elevation and in its initial or right hand position in Fig. 30, and in its extreme left hand position in Fig. 39. Said carriage is shown in rear elevation in its initial position in Fig. 26, in longitudinal section in its extreme left hand position in Fig. 55, and in transverse section in Figs. 51 and 54. It will be observed that when in its initial position said carriage lies for the greater part between the partitions 63 and 64 and when in the extreme left hand position it lies for the greater part between partitions 62 and 63. The partition 63 is cut away as shown, for example, in Figs. 50 and 55, to permit the passage of the carriage from one position to another. As will be best understood by reference to Fig. 55, the frame of the carriage comprises a right hand end plate 71 and a left hand end plate 72 connected together by a sleeve 73 on which said end plates are held by nuts 74 threaded on to the ends of said sleeve 73. The end plates 71 and 72 are also connected by a rod 75 and bars 76, 77 and 81 (Fig. 54). The carriage is supported by and is movable along two rock shafts 78 and 79 (Figs. 54 and 55). These shafts will be more particularly referred to hereinafter. The shaft 78 extends through the sleeve 73. A nose 80 of each of the end plates 71 and 72 rests on the shaft 79 and the bar 76 extends beneath said shaft so that the front portion of the carriage is supported and guided by said shaft. Nuts 82 are threaded on to the ends of the rods 75 outside of the frame plates 71 and 72. The carriage is drawn toward the left by a cord, strap or chain 83 which runs over a pulley 84 in the partition 62 and over a spring actuated pulley 85 (Fig. 30). This pulley is driven by a spring coiled within a drum 86, which is fixed to a sleeve 87 loosely mounted on a shaft or rod 88 (Figs. 11 and 13). The shaft or rod 88 is supported at its ends by the partitions 61 and 62. Adjacent the partitions 61 the sleeve 87 has fixed thereto a ratchet wheel 89 controlled by the retaining pawl 90 which is pivoted to the partition 61 at 91 and is pressed into engagement with the ratchet 89 by a spring 92. By means of this pawl and ratchet mechanism and connections, the tension of the spring in the drum 86 may be regulated.

The ten numeral keys of the typewriting machine are connected to ten rock shafts 93, which are journaled in the frame strips or bars 67 and 68 (Figs. 11 and 13). These rock shafts extend from front to back of the machine just above the bottom plate 50 and extend through the bar 68, outside of which each of the rock shafts has fixed thereon the hub 94 of a crank arm 95 (Figs. 11, 13, 22 and 26). Each of the crank arms 95 is connected by a link 96 with the key lever 4 of one of the numeral keys. In the machine here illustrated (see Fig. 5) the zero is printed by the "O" and the "1" by the L key, and these keys are included in the "numeral keys" referred to. I prefer to connect the links 96 to the key levers by an adjustable connection which is shown in Fig. 2. A U-shaped band 97 is bent over the key lever, and a lever 98 is fulcrumed in the two arms of said U-shaped plate by trunnion-like studs 99 projecting into openings 100 in said plate. A strip 101 lies against the bottom edge of the key lever between the arms of the plate 97. On either side of said arms said plate is formed with ears 102 which are bent upward to embrace the faces of the key lever. Two set screws 103 are threaded through the lever 98 on opposite sides of its fulcrum and their upper ends engage the plate 101. The link 96 is pivotally connected to the lever 98 near one end of said lever by having its lower end bent and extending through an opening in said lever. Said opening has the form of an open ended slot extending to the end of the lever 98 as shown. A screw 104, threaded through the lever, normally closes said slot and retains the link in place, but the link may be removed by withdrawing the screw far enough to clear the slot. It will be observed that this connection with the key lever does not necessitate any cutting of the lever nor the formation of any holes therein, and also that the connection is such as to afford a considerable adjustment of the crank arm 95 relative to the key lever. In order to afford a still further adjustment, the link is made in two parts, one of which is threaded into the other. The construction is such that when any of the numeral keys is depressed the rock shaft 93 connected thereto is rocked toward the left hand of the operator.

Above the rock shafts 93 and extending across the same there is mounted a series of ten reciprocatory slides 105. The form of these slides except those connected to the " O " and " 9 " keys, is best shown in Fig. 22. As will be seen by reference to Fig. 30, each of the slides 105 has one of its ends just inside of the partition 65 and the other between the partitions 61 and 62. The slides are guided by slots 106 in partitions 62, 63 and 64 through which said slides extend. These slides are shown in transverse section in Figs. 11, 13 and 50. As will be seen by reference to Figs. 24 and 25, which are views of a slide, as seen from the back of the machine, each slide 105 has pivoted to one side thereof at 106 a dog 107, the free end of which rests against a pin 108 projecting from the face of the slide 105. The dog 107 is formed with a notch 109 into which extends a crank arm 110 fixed to one of the rock shafts 93. The parts stand normally in position shown in full lines in Fig. 24; but when the shaft 93 is rocked by the depression of its key lever, the parts move first to the position shown by dotted lines in Fig. 24, after which the arm 110 escapes from the notch 109 and the slide 105 is thrown back to normal position by a spring which will be presently described, the dog being cammed up to the position shown in Fig. 25 by the end of the crank arm 110. It will thus be seen that when a numeral key is depressed to write a number, one of the slides 105 is moved a short distance to the left during a portion of the down stroke of the key; but that at a predetermined point in the down stroke of the key the slide is entirely freed from the key and returns to normal position. When the key lever is released and returns to its normal position the shaft 93 rocks back to the position shown in full lines in Fig. 24 and the dog 107 returns to its initial position impelled by gravity or by a spring 111 coiled in an annular recess in the face of the dog 107 and having one end bent into an opening 112 in said dog and the other end into an opening in the slide as shown at 113.

In case it is not desired to allow the slide 105 to snap back to normal position without waiting for the key to return to normal position, the form of connection shown in Fig. 23 may be employed. According to this modification the arm 110 extends into a notch 114 formed in a plate 115 secured to the side of the slide 105 as by rivets 116. The notch 114 has sides so formed that when the key lever is depressed, during the first portion of the down stroke of the key, the slide is moved to the left after which the arm 110 escapes from the notch 114 and moves along a circular arc-shaped edge 117 of the plate 115, and thus holds the slide 105 in operated position as shown in dotted lines in Fig. 23 until the key lever returns to normal position. It will be observed that according to this form of connection the entire motion of the slide 105 is imparted thereto during the first portion of the down stroke of the key and that during the remainder of such down stroke and during the first portion of the up stroke of the key, said slide is held in its operated position.

The particular arrangement of the key operated rock shafts and the slides operated thereby which has been described has important advantages in a mechanism of this character, and so far as I am aware this arrangement is new. As the rock shafts 93 extend in a direction from front to back of the machine, and as the slides 105 lie transversely across them, it will be seen that any of said rock shafts may be connected to any of said slides, and said rock shafts may be spaced across the machine in any desired manner, thus accommodating the adding attachment to any peculiarity or irregularity in the arrangement of the keys of the typewriting machine. It will be observed that such an irregularity actually exists in the machine shown in this case, the numeral keys not being spaced uniform distances apart, and not being arranged in serial order. Furthermore, by the described arrangement, the spacing apart of the slides 105, is altogether independent of the arrangement of the keys; and as said slides extend transversely of the typewriting machine or longitudinally of the adding attachment, the arrangement admits of operatively connecting said slides to the adding mechanism in any one of a variety of ways, and at any point or points along the length of the slides. It will thus be perceived that the combination and arrangement of these parts have advantages which are not confined to the particular adding mechanism here shown and described.

In the present machine each of the slides 105 coöperates with a universal bar which controls an escapement for the carriage 70 and also controls a device for releasing certain setting-up devices mounted in said carriage. The universal bar and the parts immediately connected therewith occupy a portion of the space between the partitions 61 and 62. This mechanism is shown in front elevation in Fig. 30, in isometric projection in Fig. 22 and in section and end elevation in Figs. 6, 7, 11, 12 and 13. As shown most clearly in Figs. 13, 22 and 30, the universal bar 118 extends across the series of slides 105, each of which has projecting from its upper side a lug 119 engaging the right hand face of said bar. While the part 118 is not here shown in the form of a bar, yet it has the relations and performs the functions of the part which in key operated machines generally is called a universal bar, and hence I use this term in referring to said part. A bracket 120 (Fig. 30), here shown as a cylindrical piece, is secured to and projects from the partition 62; and the bar 118 is formed with two upwardly extending arms 121 through which passes a rod 122, which rod passes through and is journaled in the cylinder-shaped bracket 120. The rod 122 thus forms a support and fulcrum for the universal bar. As most clearly shown in Fig. 22, one of the arms 121 has extending to the left therefrom an arm or segment 123, the free edge of which is formed with a series of teeth 124 constituting a segment of a crown gear. As best shown in Figs. 13 and 30, a plate 125 is secured to the end of the bracket 120 by screws 126, and a spring 127 is connected at one end to said plate and at the other to the arm 123. It is the downward tension of this spring on the arm 123 which normally holds the universal bar in its right hand position, and which returns the slides 105 to normal position when the arm 110 escapes from the notch 109 in the dog 107. When the machine is in operation the gear teeth 124 mesh with the teeth of a segmental rack 128. The segmental rack 128 is on one arm of what is in effect a bell crank lever 129 which is fulcrumed on a shouldered and headed screw 130 which is threaded into an arm or lever 131. The lever 131 is fulcrumed on a shouldered and headed screw 132 which is threaded into the partition 61. The screw 132 is shown in dotted lines in Figs. 11 and 12, and is better shown in Figs. 6 and 7.

As is best shown in Figs. 6 and 7, the rack 128 may be moved into and out of engagement with the teeth 124 by oscillating the lever 131 on its pivot. Said lever is normally held in position to disengage the rack teeth by a spring 133 connected at one end to the partition 61 and at the other end to a pin 134 projecting from the face of the lever 131 below the pivot thereof. One arm of the bell crank lever 129 extends downwardly from the pivot 130 of said lever and has a shouldered and headed screw 135 threaded into it. This screw is shown in section in Figs. 6, 7 and 13. It will be observed that said screw is about the same distance from the fulcrum 130 of the lever 129 as said fulcrum is from the fulcrum 132 of the lever 131 and that said screw 135 stands nearly in line with the fulcrum screw 132. The arrangement is such that as the lever 131 is rocked to bring the racks 124 and 128 into or out of engagement, the screw 135 has only a very slight movement imparted thereto, and practically no movement at all in a front and back direction. The screw 135 extends loosely through a slot 136 in an irregular shaped link or connecting bar 137. At its rear end said link is pivoted at 138 to an arm 139 extending from a hub 140 (see Fig. 27) which is loose on a shaft 141. These parts will be more fully described hereinafter. The front end of the link 137 is pivoted at 142 to an arm 143 which is fixed on a rock shaft 144 on which is fixed the escapement mechanism which controls the step-by-step motion of the carriage 70. It will be observed that the construction is such that if a numeral key be depressed when the racks 124 and 128 are in mesh, the universal bar will be rocked, which will rock the bell crank lever 129 which, through its pin 135, will reciprocate the link 137, which will impart an oscillation to the hub 140 and to the rock shaft 144; but if the universal bar be rocked when said racks are out of mesh, the remainder of the adding mechanism will not be affected thereby. A second plate 145 is fixed to the end of the bracket 120 beneath the plate 125, as shown in Figs. 13 and 30. The lower end of this plate 145 has secured thereto one end of a spring 146, the other end of which is secured to a pin 147 projecting from the arm 139. This spring tends to pull the link 137 toward the front of the machine, which is the normal position of said link. The motion of the parts under the impulse of the spring 146 when the racks 124 and 128 are out of mesh, is limited by a pin 147' projecting from the lever 131 into the path of the lower arm of the bell crank 129. The parts are so constructed as to afford an adjustment between the lower arm of the bell crank 129 and the rack 128. To this end the rack teeth are formed on a segment 148 which is pivoted on the screw 130. A headed screw 149 extends through a slot 150 in the bell crank 129 and is threaded into the plate 148. By loosening the screw 149, the bell crank 129 and the plate 148 may be left free to be adjusted the one with reference to the other and these parts are secured in adjusted relation by tightening the screw. When the screw 149 is thus tightened the parts are rigidly connected together and operate as a single piece.

It will be perceived from what has been said above that the universal bar 118 is disconnected from the mechanism which it is designed to control whenever the lever 131 is in its forward position; and that said lever is normally held in its forward position by the spring 133. The means for moving said lever back to bring the racks 124 and 128 into engagement may be understood by reference to Figs. 6 to 12 inclusive and Fig. 22. At the point where the shaft 79 passes through the partition 61, said shaft is loosely surrounded by a sleeve which is journaled in an opening in said partition 61 and which has on the outer or left hand end thereof a milled head 151 by which said sleeve may be turned to either of two positions. Said sleeve terminates just inside of the partition 61 where it has fixed thereto a cam arm 152. When the parts stand in such position that the arm 152 hangs downward as shown in Figs. 6 and 7, said parts have no effect on the lever 131; but when by manipulation of the milled head 151 the arm 152 is turned into the position shown in Figs. 11 and 22, said arm 152 engages the edge of the lever 131 and presses said lever to its rear or operative position. It will be seen that the parts can be connected up in this manner at any time at the will of the operator and that they will remain connected up as long as the arm 152 is left in its upper position.

In addition to the device just described, I have also provided means whereby the parts may be automatically connected up during a predetermined portion of the travel of the carriage of the typewriting machine. Referring for example to Figs. 6, 7 and 8, a bracket 153 is clamped to the front of the top plate 2 of the typewriting machine by means of a thumb screw 154. Said bracket is formed with two upwardly projecting arms 155 in which is journaled a short shaft 156 having fixed to its back or inner end a crank arm 157. A headed and shouldered screw 158 is threaded through the outer end of the arm 157, and a lock nut 159 is threaded onto the end thereof. Upon this screw is journaled an anti-friction roller 160. Referring to Fig. 2 it will be seen that a square rod or bar 161 is supported by brackets 162, to which it is secured by screws 163, and said bracket is supported from the bracket 43 of the carriage scale by screws 164. Referring back to Figs. 6, 7 and 8, I have there shown a cam or contact block 165 having in the front face thereof a groove of rectangular cross section adapted to embrace the rod 161. As shown in Fig. 8 said groove is wider in an up and down direction than the rod 161 and above said rod and within said groove there is a strip 166 held in position by screws 167 which extend through openings in the block 165 and are threaded into the strip 166. The screws 167 are loose in their openings but are prevented from being displaced therefrom by their heads which are countersunk into said block 165. A clamping screw 168 having a milled head is threaded through the upper part of the block 165 and at its lower end engages the strip 166. The block 165 may be placed upon the rod 161 and adjusted to any position along said rod by reference to the scale 42 and clamped securely in position by tightening the screw 168. The block 165 is beveled at its ends as shown at 169. The arm 157 is normally held up in the position shown in Fig. 6 by a spring 170 which is coiled about the shaft 156 and is secured at one end to said shaft and at the other to one of the posts 155. It will be readily understood that as the contact block 165 moves back and forth with the carriage it depresses the roller 160 and arm 157 and holds them in depressed position during a number of letter space positions of the carriage, which number depends upon the length of the contact piece. When in the travel of the carriage the contact piece reaches the roller 160 one of the cam surfaces 169 depresses said roller and it is held in depressed position until the contact block has entirely passed it when it is restored to normal position by the spring 170.

The shaft 156 has fixed to its front end an arm 171 which extends from said shaft in a direction substantially horizontal and in the opposite direction from the arm 157 so that arms 157 and 171 together constitute in effect a lever of the first order. At its free end the lever 171 has pivoted thereto a link 172 which at its lower end is pivoted to an arm 173 which in turn is pivotally supported by a headed and shouldered screw 174. The arm 173 is shown in detail in Fig. 10 where it will be seen that a screw 175 is threaded through the free end of said arm and has threaded on the right hand end thereof a headed sleeve nut 176, the sleeve portion of which forms a bearing for the end of the link 172. The other end of the screw 175 is shouldered as shown and has journaled on its shouldered portion an anti-friction roller 177 which when the parts occupy the position shown in Fig. 6 rests in a cut-out portion 178 of the front face or edge of the lever 131. Said lever 131 extends upward from said cut-out portion and the front edge thereof above such cut-out portion is formed substantially in the arc of a circle having the pivot 174 as its center. When the roller 177 is resting in the cut-out portion 178 said roller does not hold the lever 131 in its rear position; but if the anti-friction roller 160 be depressed by the contact block 165, thus elevating the link 172 and the arm 173, the roller 177 moves to the position shown in Fig. 7 and cams the arm 131 to its rearward position, throwing the segmental racks 124 and 128 into mesh. It will be seen that by the means which have been described the carriage may automatically bring the universal bar 118 into operative connection with the mechanism which it is designed to operate, and may maintain such connection during a predetermined number of letter space movements of the carriage.

I have provided means whereby the above described carriage connections may be thrown into or out of operation as may be desired. To this end the pivot screw 174 of the arm 173 is not threaded into a fixed portion of the machine but is threaded into a disk 179 which is fixed to or formed on the end of a short shaft 180 (see Fig. 8), which passes through an opening in the partition 61 and has a milled head 181 secured thereto by a set screw 182 threaded through the hub of said milled head 181 and engaging said shaft 180. The turning of the shaft 180 in either direction is limited by a pin 183 projecting from the inner face of the partition 61 into a segmental notch 184 in the disk 179. The pivot screw 174 is threaded into the disk 179 eccentrically so that when the disk 179 stands in the position shown in Figs. 6 and 7 the roller 177 is in position to operate the lever 131 as shown and described; but when the disk 179 is in the position shown in Figs. 11 and 12 the roller 177 is withdrawn from engagement with the lever 131 and is inoperative to move said lever to its rear position even though the roller 160 be depressed by the contact block 165.

The means for yieldingly holding each of the milled heads 151 and 181 in either of its positions is best shown in Fig. 9. These milled heads are close together and each of them has its hub flattened in two places as shown at 185. A spring 186 is bent into the form shown in Fig. 9 with one portion thereof encircling a pin or headed screw 187 secured to the partition 61. The two arms of the spring 186 extend between the two hubs and press against the flattened surfaces thereof to hold each of them in the position to which it has been moved. The spring 186 is shown in dotted lines in Fig. 11.

It will be perceived that two means have been provided for bringing the adding mechanism into operation, one a hand operated means by which said mechanism can be brought into operation at any time, and the other a carriage controlled means by which the adding mechanism may be brought into operation automatically at any predetermined portion of the line of writing; and that said automatic means may be thrown out of operation at will. In Fig. 12 the parts are shown in the position they occupy when the adding mechanism is entirely out of operation; in Figs. 11 and 22, in the position they occupy when the adding mechanism has been thrown into operation by the hand operated means; in Fig. 6 in the position they occupy when the adding mechanism is out of operation but is ready to be automatically brought into operation when the carriage shall have reached the proper position; and in Figs. 7 and 8, in the position they occupy when the adding mechanism has been brought into operation by the carriage.

It will be observed that the contact block 165 may be readily removed from the machine. I contemplate providing a number of such blocks of different lengths, the longest contact block being long enough to maintain the adding mechanism in operation through a number of letter space positions corresponding to the full capacity of the machine, the shorter ones being designed for use when it is desired to write numbers and automatically add the same in a number of denominations less than the full capacity of the machine. By this means where the numbers to be added are small, other numbers which it is not desired shall be added on the adding machine may be written closer to the adding column without affecting the adding mechanism than would be possible if the adding mechanism were maintained in operation through a greater number of letter space positions.

Instead of varying the width of the adding column by the means just described, I prefer to employ for this purpose a single contact piece which is adapted to automatically bring the adding mechanism into operation in the same manner as the contact piece 165, but which is itself adapted to be adjusted so as to vary the number of letter space positions in or during which the adding mechanism is maintained in operation to any number up to the full capacity of the machine. The form of contact block which I employ is shown in Figs. 1 to 5 inclusive. As most clearly shown in Figs. 3 and 4, this contact piece comprises a sleeve 188 having a squared longitudinal opening whereby said sleeve is slidably mounted on the square rod 161. The sleeve 188 is enlarged at one end and has threaded therethrough a set screw 189 the end of which engages the rod 161 so that the sleeve may be moved to any desired position longitudinally of the rod 161 and secured in such position. The sleeve 188 is rounded throughout the greater part of its length to receive a series of rings 190 which are split as shown in Fig. 3 at 191' and each of which is sprung onto the sleeve 188 so as to engage the same with a sufficient degree of friction to hold the ring in either of two positions to which it is designed to be adjusted. Each of the rings 190 has projecting from one side thereof a lug 191. A pin 192 projects outwardly from each of the rings to serve as a handle, and the inner end of said pin projects into a segmental longitudinal groove or slot 193 formed in the surface of the rounded portion of the sleeve 188. The motion of the inner end of the pin 192 is limited by the edges of the slot 193. When any ring is turned to the position shown in dotted lines in Fig. 3, its lug 191 projects downward into position to engage the roller 160; but when any ring is turned to the position shown in full lines in Fig. 3 the lug 191 thereof is out of the path of said roller 160 and is inoperative to depress the same. The rings 190 are held against endwise movement on the sleeve 188 in one direction by the enlarged end of said sleeve, and in the other direction by a nut 194 threaded on to the reduced end of the sleeve. Each of the rings 190 has a thickness or breadth equal to one unit of feed of the carriage so that when one of the rings is turned to the position shown by dotted lines in Fig. 3 the carriage will bring the adding mechanism into operation through only one letter space position of the carriage. If two rings are turned to this position the adding mechanism is operative through two letter space positions of the carriage, and so on. Each of the lugs 191 is rounded on its end in order to coöperate with the roller 160. In the drawings I have shown thirteen rings of which eight are shown in operative and five in inoperative position. The adding mechanism here shown is adapted to add numbers of only ten denominations, but if such numbers be pointed off with decimal points and commas, the adding column will have a width of thirteen letter spaces (e. g., 99,999,999.99.)

So far as I am aware it is broadly new to provide a combined writing and adding machine having means for printing numeral and other characters and means for automatically bringing the adding mechanism into operation through a predetermined portion of the line of writing, with any means whatever whereby the machine can be set so as to automatically bring the adding mechanism into operation through different numbers of denominational positions, thus regulating the width of the adding column.

The escapement mechanism for the carriage 70 comprises a feed rack 195 (Figs. 30 and 39, for example) the teeth of which are formed on a downwardly projecting portion of the plate 76 which has been described above. Said rack teeth are engaged by feed dogs mounted on a rocker frame 196 secured upon the rock shaft 144. As best shown in Fig. 30 said rock shaft 144 is journaled in an opening in the partition 61 and passes through the partition 62 and into a sleeve-like portion of the rocker frame 196. As best shown in Fig. 21 the shaft 144 terminates in said rocker frame at 197 and is rigidly secured to said rocker frame by pins 198 passing through said frame and shaft. The rocker frame 196 has projecting from the right hand end thereof a hub 199 which extends through the partition 63 (see Fig. 22). This hub and opening constitute in effect a journal bearing for the right hand end of the shaft 144 and prevent endwise motion of said shaft in one direction. Endwise motion of said shaft in the other direction is prevented by a collar 201 fixed on said shaft adjacent the partition 62. The details of the escapement mechanism are best shown in Figs. 14 to 22 inclusive. The rocker frame 196 is formed on the upper side thereof with a flat surface 202 on which the loose dog 203 is pivoted by means of a shouldered and headed screw 204 passing through said dog and threaded into said frame. Said loose dog is normally pressed toward the front of the machine by a spring 205 which is coiled about the screw 204 and is connected at one end to the dog and at the other end to the rocker frame. The upper right hand portion of the rocker frame 196 is formed to constitute a fixed dog 206 having a wide base against which the loose dog 203 is normally pressed by the spring 205; the fixed dog being cut back so as to leave a narrow slot between the two dogs. In Figs. 14, 15, 16 and 19 one of the teeth of the rack 195 is shown in horizontal section and by reference to these figures it will be seen that each of said teeth has a flat front face 207 substantially parallel to the direction of motion of the carriage, a left hand face 208 substantially at right angles to the face 207, said face being adapted to engage the escapement dogs, and a contact face 209 which is beveled so as to make the right hand edge of the tooth thinner than the left hand edge. The end of the loose dog projects slightly beyond the end of the fixed dog as shown and is formed with an upwardly extending lug 210 which has a face 211 (Fig. 22) the plane of which is substantially perpendicular to the direction of movement of the carriage, and a front beveled face 212. The upwardly extending fixed dog 206 also has an engaging face 213 in a plane parallel to that of the face 211 of the loose dog 203, and said fixed dog is beveled away as shown at 214. In Fig. 14 the parts are shown in their normal positions with a tooth 195 in engagement with the loose dog. When a numeral key is depressed, the rocker frame 196 rocks slightly toward the back of the machine, moving the loose dog out of the path of the tooth 195 and bringing the fixed dog into the path of said tooth as shown in Fig. 15. When the rocker frame rocks back to its normal position the fixed dog moves out of the path of the tooth 195 of the feed rack, but the loose dog is held by engagement of its projecting end with the tooth 195 against returning to its forward position, with the fixed dog, and said loose dog is thus forced to oscillate slightly on its pivot to the position shown in Fig. 16, thus freeing the tooth 195 from both dogs and permitting the spring drum 86 to draw the carriage to the left by the cord 83. As the tooth 195 passes the escapement dogs, the loose dog is returned by its spring 205 into engagement with the fixed dog, the beveled surface 212 following the beveled surface 209 as the tooth 195 moves past the dog. By this arrangement even while the tooth 195 is moving past the lug 210 of the loose dog, said loose dog is moving its engaging surface 211 into position to arrest the next succeeding tooth 195. So far as I am aware this form of escapement mechanism is new. I am not aware of any escapement mechanism in which the tooth of the feed rack pushes the loose dog aside in the manner which has been described.

I have provided means whereby the connection between the rocker frame 196 and the link 137 may be adjusted to vary the length of the arc through which said rocker frame is oscillated at each operation of the universal bar and also to vary the point in the oscillation of said rocker frame at which the tooth of the feed rack escapes past the dogs. To this end the arm 143 to which the link 137 is pivoted is not itself rigidly connected directly to the shaft 144. Said arm 143 is bifurcated at its lower end as shown in Fig. 13, forming two arms 215 which straddle the shaft 144, the opening between said arms being elongated so as to permit of a considerable adjustment of said arm up and down. The slot 136 in the link 137 is substantially in the form of an arc having the pivot 138 as a center so as to permit of an up and down adjustment of the arm 143 without disturbing the relation of the pin 135 which projects from the slot 136 with said pivot 138. As best shown in Fig. 22 a headed screw 216 extends through a vertical slot 217 in an arm 218 and is threaded into the arm 143. The construction is such that said arm 143 may be adjusted up or down, the screw 216 moving up or down in the slot 217, and said arm 143 may be fixed in the position to which it has been adjusted by tightening the screw 216. The effect of this adjustment will obviously be to vary the distance of the pivot 142 from the axis of the shaft 144, thus varying the lever arm of said pivot. Such an adjustment will obviously have the effect of varying the length of the arc through which the feed dogs will be moved by a given motion of the link 137. The arm 218 projects from one end of an elongated hub 219, the other end of which, as shown in Fig. 30, is adjacent the partition 62 and as best shown in Fig. 22, has extending therefrom an arm 220 which is split longitudinally of the shaft. A screw 221 passes through one branch of the split arm 220 and is threaded into the other. When this screw is loose the shaft 144 may be adjusted to any angular position in the hub 219 and it may then be fixed in such position by tightening the screw 221.

In the operation of the present machine it is sometimes necessary to move the carriage 70 to its extreme left hand position. This could be done step-by-step fashion as will hereinafter appear by rapid operation of the "0" key; but I prefer to use means whereby the carriage may be entirely freed from the feed dogs and allowed to move to its extreme left hand position by a single movement. By an inspection of Fig. 14, which shows the escapement mechanism in its normal position, it will be obvious that this can be done by simply pressing the loose dog 203 out of the path of the teeth 195 of the feed rack and holding said loose dog in this position until the carriage has reached its extreme left hand position. For this purpose the edge of the loose dog is beveled at 222 and a wedge or cam 223 is mounted in position to engage said beveled portion 222 as shown for example, in Fig. 14. It is obvious that by pressing the wedge or cam 223 to the left, the loose dog will be cammed toward the back of the machine and out of the path of the feed rack. This operation is illustrated in Fig. 19 where the feed dog and wedge are shown in their normal position by full lines and in their release position by dotted lines. The wedge 223 is mounted in a manner which will be best understood by reference to Figs. 20 and 21 where it will be seen that said wedge or cam consists of a lug projecting upwardly from a hub 224 fixed on the end of a rod 225. The rocker frame 196 is cut away, as shown in Fig. 21, to accommodate the hub 224, and has an opening extending upward from said cut-away portion to receive the wedge 223. These openings are long enough to permit the necessary motion of said wedge to the left when it is operated. The rod 225 extends through an opening made for the purpose in the right hand end of the rocker frame 196, said opening being in line with the axis of the shaft 144 and passing through the hub 199. The rod 225 extends through this opening in the hub and hence through the partition 63 (Figs. 19 and 22). As best shown in Fig. 19, the rod 225 extends a short distance to the right of the partition 63, and a short distance from its end said rod has fixed thereon a collar 226. A spring 227 coiled about the rod 225, is compressed between the collar 226 and the end of the hub 199 and holds said rod in its normal right hand position but permits it to be pushed to the left in order to release the carriage. The rod 225 is pushed to the left for this purpose by pressing upon a finger button or key 228 fixed on the end of a rod 229 which projects from the right hand end of the machine. The rod 229 extends through openings in the end frame piece 58 and the partitions 65 and 64. Just inside the partition 65, said rod has a portion bent downwardly as shown at 230 to avoid interfering with certain parts of the mechanism which will be described hereinafter. As best shown in Fig. 19, the left hand end of the rod 229 is formed with a recess 231 into which the end of the rod 225 extends. It will be perceived that the carriage 70 may be drawn to the right at any time, in which case the beveled surface 209 of each of the teeth 195 of the feed rack engaging the beveled surface 212 of the loose dog, cams said loose dog aside. The loose dog will snap back behind each tooth so that the carriage may be freely drawn to the right and the escapement dogs will arrest it in any position in which it may be stopped. When the rocker frame is oscillated in the operation of the step-by-step mechanism, the wedge 223 and its rod 225 oscillate with it, this motion being permitted by the nature of the connection between the rod 225 and the push rod 229. As will be seen by comparing Figs. 21 and 22, the opening through which the cam 223 extends upward from the hub 224, has the form of a longitudinal slot in the rocker frame 196, which slot positively compels the cam to oscillate in unison with the rocker frame, thus avoiding any liability of the loose dog being interfered with by said cam in the ordinary operation of the escapement mechanism.

The carriage 70 has mounted therein the setting-up and indicating mechanism which will now be described. This mechanism is best illustrated in Figs. 26, 48, 49, 51, 54, 55, 58 and 59. As best shown in Figs. 51, 54 and 55 the sleeve 73 which, as has been said above, is one of the means which connect together the end pieces 71 and 72 of the carriage and which slides on the shaft 78, has journaled thereon a series of setting-up wheels 232. Each of these setting-up wheels has cut in its periphery a series of gear teeth 233 which mesh with a pinion 234 fixed to the side of an indicator wheel 235. These indicator wheels are journaled on the rod 75 which is fixed at its ends in the end plates 71 and 72 of the carriage. As shown for example in Fig. 30, the indicator wheels 235 have upon their peripheries the digits from "0" to "9" inclusive. In the operation of the machine by the keys the setting-up wheels 232 are turned one at a time through one or more units of rotation according to the numerical value of the key depressed, and the indicator wheels 235 are turned correspondingly and indicate by the numerals upon their peripheries the number which has been set up on the setting-up wheel. As shown in Figs. 54 and 55, each of the setting-up wheels 232 is formed with a hub 236 to which is connected the inner end of a helical spring 237, the outer end of which is connected to a pin 238 projecting inward from the bar or plate 76. This spring 237 tends to turn the setting-up wheel toward the back of the machine and when the parts are in normal position the wheel is held against turning under the impulse of said spring by a dog or pawl 239 which is pivoted on a shaft 240, which shaft is supported with freedom to rock to a slight extent in the end pieces 71 and 72 of the carriage. The dog 239 coöperates with a series of ten ratchet teeth 241 formed in a portion of the periphery of the setting-up wheel 232. The arrangement of the dogs 239 upon the shaft 240 will be best understood by reference to Figs. 58 and 59. Said shaft 240 has a longitudinal slot in which is supported a plate or wing 243, the outer edge of which has rectangular notches cut therein back to within a short distance of the shaft 240 and the teeth or tongues 244 thus left extending from the wing 243 are each bent in the form shown in Fig. 59. Each of the dogs 239 has its hub portion cut away as shown at 244 to leave an opening through which the wing 243 extends, and this opening is of sufficient width to allow of a certain amount of oscillation of the dog on the shaft. Each of the dogs is also bifurcated in the manner shown in Fig. 58 and one of its forks is prolonged upward to engage the teeth of the ratchet. Within the opening, between the forks of the dog, a flat spring 245 is mounted and bent into the form shown in Fig. 59 where it will be seen that the spring is bent around the shaft 240, under the end of the tongue 244 and up into the space between the folds of said tongue, the lower end of the spring pressing backward on the tail 246 of the dog. The tension of the spring is exerted between the tongue 244 at one end and the tail of the dog at the other, thus pressing the portion 247 of the hub into engagement with the wing 243. When the parts are in the position shown in Fig. 59, the end of the dog is in engagement with one of the ratchet teeth 241, as shown in Fig. 54. It will be perceived that the dogs are all mounted on a shaft or frame, and each is spring-pressed against a stop on that frame. If the frame stands still, any dog may be moved against the tension of its spring; but if the frame itself be moved, all of the dogs move with it, and none of the springs is bent by such motion. By this construction any one of the dogs 239 may be pressed out of engagement with its setting-up wheel against the tension of its spring 245 but the whole series of dogs may be moved together out of engagement with the setting-up wheels by oscillating the shaft 240 and this movement is not resisted by said springs. The shaft 240 is rocked for this purpose in the act of setting the register wheels to zero, as will more fully appear hereinafter.

As has been said above, the rear end of the link 137 (see Fig. 26) is pivotally connected to an arm 139 which is loose on a rock shaft 141. Said rock shaft is journaled at one end in the partition 61 and extends through the partition 62 and is journaled at its other end in the partition 63, through which it extends a short distance. The hub 140 is held against endwise movement on the shaft 141 by a screw 248 threaded into said hub and having its reduced inner end 249 extending into an annular groove 250 in the shaft 141, as shown in Fig. 28. The hub 140 has formed in one face thereof notches 251 so that said hub constitutes one member of a clutch, the other member of which is a sleeve 252 slidably mounted on the shaft 141 and having teeth 253 adapted to engage in the notches 251. The sleeve 252 is held against rotation relatively to the shaft 141 by a pin 254 which passes through said shaft and through longitudinal slots 255 in said hub (see Figs. 27 and 29). The sleeve 252 has an annular groove 256 in which run the forks 257 of a bifurcated crank arm 258, the spindle or axle 259 of which is journaled at its ends in the two arms of a U-shaped bracket 260 which is secured to the bottom plate 50 of the machine (Fig. 29). The bracket 260 has the form shown in Fig. 26 and has journaled therein in addition to the spindle 259 of the arm 258, the spindle 261 of a piece 262, a portion 263 of which is formed into a cam which engages lips or cam projections 264 and 265 formed on branches of the arm 258. Another portion of the piece 262 extends toward the front of the machine a short distance as shown in Fig. 29 and terminates adjacent the rear face of that slide 105 which is controlled by the "0" numeral key of the typewriting machine where it is formed with a slot 266 into which projects a pin 267, which pin is fixed in said zero slide 105. The parts are normally in the positions shown in Figs. 26 and 29 with the clutch members in engagement so that the depression of any numeral key except the "0" key results in rocking the shaft 141; but when the "0" key is operated the cam 263 is moved to the position shown in Fig. 27, thus disconnecting the clutch members and causing the hub 140 to rock idly on the shaft 141 leaving said shaft stationary. In said Fig. 27, the parts are shown in the position they occupy at the instant when the "0" key has reached that point in its downstroke at which the slide 105 is about to snap back to normal position. From what has been said it will be perceived that if any numeral key be depressed when the adding mechanism is connected up for operation, the universal bar 180 will be oscillated and the escapement mechanism will be operated to feed the carriage one space to the left; and that the shaft 141 is rocked by any of the numeral keys except the "0" key. As shown in Figs. 26 and 50 an arm 268 is mounted on the shaft 141 just to the right of the partition 63 in position to engage the tail 246 of any one of the dogs 239 which may occupy that position at the time, and press said tail 246 toward the front of the machine, thus moving said dog 239 out of engagement with the ratchet teeth 241 of its setting up wheel 232. Each of the dogs 246 has one edge rounded as shown in Fig. 26 at 269 to facilitate the passage of said tails past the arm 268 as the carriage is fed toward the left step-by-step. In order to provide an adjustment of the arm 268 said arm is not fixed directly to the shaft but is loosely mounted thereon and extends upward above the shaft as shown at 270 and at its upper end is bent forming a lug 271. An arm 272 has a hub 273 which is fixedly mounted on the shaft 141 as by a pin 274 extending through said hub and shaft. At its upper end the arm 272 is bent, forming a lug 275, Fig. 26, through which passes a headed screw 276 which is threaded into the lug 271. The lugs 275 and 271 are yieldingly held apart by a spring 277 coiled about the screw 276 and compressed between said lugs. The relation of the arm 270 to the fixed arm 272 may be adjusted by tightening or loosening the screw 276, thus moving the operative end of the arm 268 nearer to or farther from the tails 246 of the dogs 239. Each of the setting-up wheels 232 has a tooth 278 which normally stands almost in contact with the frame bar 77 of the carriage. As best shown in Fig. 54, the tooth 278 is formed on a lug 280 projecting from the left hand face of the setting-up wheel, and said tooth 278 projects beyond the periphery of said setting-up wheel.

As shown in Figs. 22, 30 and 50, each of the slides except that controlled by the "0" key and that controlled by the "9" key, has projecting from its upper edge a lug 279. As shown in Fig. 30, each of said lugs normally stands in such a position that when the slide 105 is moved slightly to the left by the depression of a key, the lug 279 of said slide will stand in the path of the tooth 278 of that setting-up wheel which is in position to be released by the arm 268. Referring to Fig. 50, the slides 105 corresponding to the keys "0" "1" "2"

"3" "4" "5" "6" "7" "8" and "9" are arranged in regular succession, the one at the back of the machine, that is to say at the right in Fig. 50, being the "0" slide and the others following in regular succession. It will be seen by reference to said Fig. 50 that the lugs 279 are so bent and positioned that the lug 279 which is on the "1" slide will arrest a tooth 278 after it has moved a distance corresponding to one ratchet tooth 241; the next one will arrest said tooth at double this amount of motion and so on. The "0" slide is not provided with a lug 279 as this slide does not release the setting up wheels and the "9" slide is also unprovided with such a lug, the frame bar 81 of the carriage being in position to arrest the tooth 278 in the position corresponding to the number "9". This arrangement of the frame bar 81 is best shown in Fig. 51.

The operation of this portion of the mechanism is as follows: When the adding mechanism is in its initial position the carriage stands in the position shown in Fig. 30 with the left hand setting-up wheel 232 in position to be released by the arm 268 and to be arrested by one of the lugs 279 or by the frame bar 81. If now the racks 124 and 128 be in engagement and the "4" key be depressed the slide 105 corresponding to said key will be moved to the left, moving the universal bar and the link 137. This oscillates the rocker frame 196 of the escapement mechanism toward the back of the machine, causing the tooth 195 of the carriage feed rack to engage the fixed dog of the escapement mechanism, which results in only a very slight movement of the carriage. At the same time the arm 268 engaging the tail 246 of the left hand dog 239 releases the left hand setting-up wheel 232, which is turned by its spring 237 until the tooth 278 thereof is arrested by the fourth lug 279, thus moving the fourth tooth 241 above the dog 239 into position to be engaged by said dog. When the slide 105 begins to return to normal position and the arm 268 is moving away from the tail 246 of the dog 239, said dog is moved by its spring 245 into engagement with the tooth 241 of the ratchet, and the setting-up wheel is held in the position to which it has been set. In turning through four units of movement the setting-up wheel 232 has turned the pinion 234 and indicator wheel 235 to position to display the figure "4". As the return movement of the slide 105 is continued the rocker frame 196 of the escapement mechanism moves to its forward position, releasing the first tooth 195 of the feed rack, and the carriage is drawn one step to the left by the spring drum 86, thus bringing the second setting-up wheel into position to be set up and the first indicator wheel into register with the units' opening 308 in the casing. In case the "9" key be depressed the operation is the same, except that the tooth 278 is arrested by the bar 81 instead of by one of the lugs 279. In case the "0" key is depressed the escapement mechanism is operated but the setting-up wheel is not released so that said setting-up wheel and its indicator pass the operative position without having been rotated.

As will appear hereinafter, the setting-up wheels and indicators, after having been set up, are returned to "0" position for three different purposes: first, in the operation of adding on the register wheels a number set up on the setting-up wheels; second, for the purpose of correcting mistakes made in setting-up a number; and third, in the operation of resetting the register to zero. The setting-up wheels are reset to zero position by an oscillation of the rock shaft 78, which oscillation is imparted to said shaft by means which will be described hereinafter. As shown in Figs. 47 and 55, the shaft 78 is journaled at one end in the partition 62 and at the other end in the partition 64 through which it passes. A segmental or mutilated pinion 280 (Fig. 47) is fixed on the shaft 78 at its right hand end just to the right of the partition 64. The shaft 78 has a longitudinal groove 281 (Fig. 53) extending the entire length thereof between the partitions 62 and 64. As best shown in Fig. 55, a strip of metal 282 having nearly the length of the carriage 70 lies in said groove and slides back and forth therein as the carriage moves back and forth. The strip 282 has projecting therefrom a series of lugs or arms 283 one for each of the setting-up wheels 232. In Fig. 54, the strip 282 is shown in section through one of the lugs or arms 283. Said lugs or arms extend outward from the shaft 78 through slots in the sleeve 73. The disposition of these slots along the sleeve will be understood by reference to Fig. 55 and the extent of each of said slots around the sleeve is indicated in Fig. 54. By reference to said Figs. 54 and 55 it will be seen that each of the hubs 236 of the setting-up wheels 232 has a notch 284 on its left hand side, which notch corresponds to one of the slots in the sleeve 73. When one of the setting-up wheels 232 is set up by its spring 237, it turns toward the left in Fig. 54, which turning motion is permitted by the disposition of the slot 284 and the arm 283; but it will be perceived that if the shaft 78 be rocked toward the front of the machine, that is to say, toward the right in Fig. 54, the setting-up wheel will be restored to normal position, the dog 239 snapping behind the last tooth 241 as shown in said figure. The strip 282 is held in the groove 281 by the sleeve 73 and is slid back and forth in said groove by the engagement of the arms 283 with the edges of the slots in said sleeve 73 so that the setting-up wheels may be restored to normal position by an oscillation of the shaft 78 no matter in what position the carriage 70 may be standing at the time. When the setting-up wheels are thus restored to normal position the indicator wheels 235 will obviously also be set to zero.

The register wheels 290 (Figs. 51, 54 and 55) are loosely mounted on a shaft or rod 291 which extends from the partition 62 to the partition 63. This rod is held in place in the machine by the sides of a slot 292 (Fig. 50) in a latch 293 engaging the edges of an annular groove 294 (Fig. 55) formed in the end of the rod 291 where it projects through the partition 63. The register wheels 290 have the usual drums which have on their peripheries the digits from "0" to "9". Said drums are supported by webs 295, (Fig. 55) each of which is fixed on a sleeve 296 which is journaled on the rod 291. The projecting end of the sleeve 296 has gear teeth formed thereon and constitutes a pinion 297. Between the successive sleeves 296, disks or brackets 298 are supported. Each of said brackets comprises a piece of sheet metal formed with two openings through one of which passes the rod 291, and through the other a second rod 299. As will be best understood by reference to Fig. 30, said rod 299 is supported at one end by the partition 63 and at the other end by a bracket 300 fixed to the partition 62. This bracket springs out from said partition 62 in the manner shown in Fig. 30 in order to leave space for certain parts which pertain to the zero setting mechanism. As shown in said Fig. 30 each of the brackets 298 is formed with or has fixed thereto a hub 301, and said hubs are strung on said rod 299 for the purpose of steadying the brackets and spacing them apart. Each of the brackets 298 sets for the greater part of its extent within the periphery of the drum of the register wheel and is bent outward as indicated at 302 in Figs. 30 and 54, in order to pass between the rims of the register wheels to the rod 299. A stud 304 projects from the left hand side of each of the brackets 298 and has journaled thereon a pinion 303, which meshes with the pinion 297 of the corresponding register wheel. The pinions 303 project below the peripheries of the register wheels and into position to be engaged by the racks 233 of the setting-up wheels 232 when these wheels are moved to the left with the carriage 70. The right hand pinion 303 is journaled on a stud 305 fixed in the partition 63. The construction is such that when the parts stand in the normal position shown in Fig. 30 no setting-up rack 233 is in mesh with a pinion 303; but the first step of the carriage to the left brings the first setting-up rack into engagement with the first pinion. The next step of the carriage brings the first setting-up rack into engagement with the second pinion and the second setting-up rack into engagement with the first pinion, and so on. As will be understood, if it is desired merely to add the number "5" on the register the "5" key will be struck, which will result in the first setting-up wheels 232 being moved five spaces and the carriage being then moved one space to the left. If now the shaft 78 be rocked toward the front of the machine the number "5" will be added on the register wheel. If, however it be desired to add the number "54", then after striking the "5" key the "4" key is next struck, setting up the number "4" on the second setting up wheel, after which the carriage takes another step to the left, bringing the first setting-up wheel into engagement with the second pinion and the second setting-up wheel into engagement with the first pinion. If then the setting-up wheels be reset by rocking the shaft 78, the "5" will be added on the second register wheel and the "4" on the first. It will thus be seen that the denominational value of each setting-up wheel depends upon the number of keys which are struck while the adding mechanism is in operation and before the shaft 78 is oscillated to reset said setting-up wheels.

As shown in Fig. 1, the adding mechanism is covered by a casing 306 through openings 307 in which the register wheels 290 are visible. Below said openings 307 I provide a second series of openings 308 which are so positioned that when the carriage has been moved one step the first indicator wheel at the left of said carriage is visible through the first opening 308 at the right. When the carriage has been moved two steps to the left, the first indicator wheel shows through the second opening and the second indicator wheel shows through the first opening, and so on. If the number "5" be set up on the setting-up mechanism as described above, the "5" on the left hand indicator 235 will show through the first opening 308 and it will thus be clearly indicated to the operator of the machine that the number "5" had been properly set up on the machine. If, however, the "4" key be then struck, the number "5" will appear at the second opening and the number "4" at the first opening, thus indicating that "54" has been set up on the setting-up mechanism. It will thus be seen that as the setting-up operation proceeds, the number which has been set up is visible to the operator and each digit appears to him in its proper denominational position. There is clearly indicated to the operator therefore not only what digits have been set up but in what denominational positions they stand, and this before the shaft 78 has been oscillated to add the number onto the register.

It will be perceived that I have provided a machine in which a single group of keys controls the addition of numbers in a plurality of denominations and in which the digits of the number, each in its appropriate denominational position, are indicated to the operator before said number is added on the register. This is a matter of considerable importance in machines of this type. Most ten key adding machines are open to the objection that, when adding large numbers, the operator has to pay strict attention in order to know, before striking a key, what denomination is going to be affected by it. When using such machines the operator is conscious of a sort of puzzling intangibleness about the denominational value of each digit. This defect is entirely cured in the present machine, as the operator sees the number form itself before his eyes, a digit at a time, as the keys are struck. As will appear hereinafter, I have provided means whereby in case of error the carriage may be withdrawn to its right hand position and the setting-up wheels reset without affecting the register wheels.

The transfer mechanism will now be described. As shown for example in Figs. 54 and 55, each of the sleeves 296 has fixed thereon within the drum of the register wheel a circular disk 309 which has projecting from its periphery a single transfer tooth 310 which is formed with one inclined and one abrupt face in the usual manner. A rock shaft 311 which, as shown in Fig. 47, extends through the partition 63 and is journaled at its ends in partitions 62 and 64, has mounted thereon an eccentric sleeve 312, the shaft 311 being seated in a longitudinal groove in said sleeve. Upon this sleeve are pivoted a series of bell crank arms or levers 313, each of which extends between two of the register wheels and has a tooth or lug 314 projecting from the face thereof and resting on the periphery of the disk 298 (see Figs. 60 and 61). Each of the levers 313 is pressed downward, thus pressing its lug 314 against the disk 298 by a flat spring 315 secured to the plate 66. The construction is such that the arm 313 is raised by the tooth 310 and allowed to drop again when the corresponding register wheel passes from its 9 to its 0 position. The levers 313 are trip levers, and each of them has a downwardly projecting arm 316 (Fig. 54) which, as shown in Fig. 47, normally engages the top surface of a lug 317 projecting from the side of a slide 318. The slides 318 extend in an inclined up and down direction at the back of the machine, as best shown in Figs. 47 and 51, and each of them is mounted for longitudinal motion of limited extent. As will presently appear, the transfer is effected by the upward motion of these slides, which is normally prevented by the arms 316. Each of the slides 318 is forked at its lower end as shown at 319 (Figs. 51 and 52) and said fork embraces the rock shaft 141. Each of said slides is also formed with an elongated slot 320 through which passes a rod 321. The rod 321 and the rock shaft 141 thus support and guide the slides 318. Each of the slides 318 is drawn upward to effect the transfer by the tension of a spring 322 secured at one end to a pin 323 projecting from the side of said slide and at the other end to a pin or hook 324 fixed to a bar or plate 325 which is secured to the backs of the partitions 62 and 63 by screws 326. On a rod 327 which extends in front of the series of slides 318 is fulcrumed a series of transfer racks or segments 328 which normally stand in the position shown in Fig. 51, their teeth engaging the teeth of the pinions 303. Each of the transfer segments 328 has an arm extending backward from the shaft 327 and from said arm a pin 329 projects into a slot 330, cut in the side of one of the slides 318. As will hereinafter more fully appear, means are provided for moving the shaft 327 toward the back of the machine at certain times in the operation of the mechanism in order to move the racks 328 out of engagement with the pinions 303 and in this movement the pins 329 move in the slots 330 without becoming disconnected from the slides. When the parts stand in the position shown in Fig. 51 with the lug 317 in engagement with the end of the arm 316, the segment 328 serves to lock its register wheel in the position in which it happens to be standing.

After the carriage has been stepped down until some of the setting up wheels are in engagement with the pinions 303, the number set up on said setting up wheels is added on the register wheels by an operating mechanism to be hereinafter described. The operation comprises the following steps:— The rod 327 is moved toward the back of the machine, thus withdrawing the segments 328 from engagement with the pinions 303. The rod 321 then moves to its extreme lowest position carrying with it any of the slides 318 that may have been released and moved upward by their springs 322, in the next preceding operation of the machine, and the arms 316 of such restoring slides snap in above the lugs 317 under the impulse of the springs 315. In its first downward motion the rod 321 carries the slides 318 slightly below their normal position for a reason which will presently appear. Said rod 321 then moves upward very slightly but far enough to permit the lugs 317 to engage the arms 316. The setting up wheels are then turned back to their zero positions by means of the operating handle, thus turning the pinions 303 and the register wheels which are in gear with said setting up wheels through distances corresponding to the digits of the item that has been set up on said setting up wheels. The rod 327 is then moved forward, bringing the segments 328 into engagement with the pinions 303, after which the carriage is withdrawn to its right-hand position, thus moving the setting up wheels out of mesh with said pinions 303. The rod 321 is then moved to its upper position in which it no longer prevents the slides 318 from moving upward under the impulse of their springs. If, during the resetting of the setting up wheels, any of the transfer teeth 310 has operated its lever 313 the corresponding slide 318 is unlocked and will now be pulled up by its spring 322, thus causing the transfer segment 328 to turn the next succeeding register wheel a distance of one unit of rotation. If this register wheel happens to be standing in its "9" position at the time, this movement would cause the transfer tooth 310, connected with that register wheel, to operate the next arm 313 and release the next slide 318 and transfer to the next succeeding register wheel and so on. During the time when the register wheels are being turned by the setting up wheels, if one of the transfer teeth 310 passes its lug 314 and raises the arm 313, said arm 313 is immediately free to drop again under the impulse of its spring 315, so far as the tooth 310 is concerned; and as the rod 321 is at this time in its depressed position said rod prevents the slide 318 from rising under the impulse of its spring 322 and passing behind said arm 316. I have provided means for holding the arm 313 in its elevated position under these conditions in order to prevent the transfer from being lost.

As best shown in Figs. 60 and 61, the arm 313 has a hub 331 to which said arm is fixed; and said hub is journaled on the sleeve 312. The hub 331 has an annular projection 332, between which and the arm 313 said hub is loosely embraced by the arms 333 of a bifurcated plate 334 which has the general outline of the arm 316 of the lever 313. Said plate 334 has an elongated slot 335 through which passes a headed pin 336 which is fixed in the arm 316, said slot allowing a limited degree of motion of said plate relatively to said arm. The plate 334 tends to remain in its lowest position shown in Fig. 61 partly by its own gravity and partly by reason of a spring 337 which is coiled about the hub 331 and presses on a pin 338 fixed to said plate 334. When the parts are in their normal position shown in Fig. 51, however, the plate 334 rests by the side of the arm 316 on the upper surface of the lug 317 and is held in its upper position by said lug, the spring 322 being much stronger than the spring 337. If, however, the lever 318 is tripped by the tooth 310 at a time when the slide 318 is held down by the engagement of the shaft 321 with the lower end of the slot 320, then the plate 334 drops in front of the lug 317 and prevents the lever 313 from returning to normal position. It is for the purpose of moving the lug 317 below the lower end of this plate 334 that the rod 321 is so operated as to depress the slides 318 below their normal positions in the operation above described.

The up and down motion of the rod 321 is controlled by the rock shaft 311 to which said rod is connected by suitable arms and links. To this end, as shown in Figs. 52 and 53, the rock shaft 311 has fixed thereon just inside the partition 62, a hub 339 from which an arm 340 projects toward the front of the machine. The hub 339 is shown also in Figs. 47, 56 and 57. A link 341 is pivoted to the free end of the arm 340 and said link extends downward as shown in Figs. 52, 53 and 47. The rod 321 has a reduced end which passes through an opening in the link 341 and on which is threaded a round nut 342 which extends into and is guided by a slot 343 in the partition 62 as shown in Fig. 13. The other end of the rod 321 projects through an elongated slot 344 in the partition 63 (Figs. 50 and 54), and just outside of said partition 63 said rod 321 is supported by a link 345, the upper end of which is pivoted at 346 to an arm 347 projecting from a hub 348 which is fixed on the rock shaft 311. The construction is such that the rod 321 may be moved up and down by an oscillation of the rock shaft 311. Said rock shaft is normally held in position to maintain the rod 321 in its upper position by a torsion spring 349 which is coiled about the rock shaft 311 and is connected at one end to a collar 350 fixed on said rock shaft and at its other end presses against a pin 351 which projects from the partition 63. The motion of the shaft 327 is controlled by a rock shaft 352 which, as shown in Figs. 39 and 46 to 57, extends through the partition 63 and is journaled at its ends in the partitions 63 and 64. As shown in said figure and in Figs. 52 and 53, said rock shaft has fixed thereon just inside the partition 62 an arm 353 to which is pivoted at 354 one end of a link 355, to the other end of which the rod 327 is fixed by a screw 356, the head of which projects into and is guided by an elongated slot 357 in the partition 62. Just outside the partition 63 the rock shaft 352 has fixed thereto and depending therefrom an arm 358 corresponding to the arm 353, and to the free end of said arm is pivoted at 359 a link 360, which extends toward the rear like the link 355 and is secured by a headed screw 361 to the end of the rod 327 which projects through and is guided by an elongated slot 362 in the partition 63. The rod 321 is guided by its slots to move in a direction substantially parallel with the direction of movement of the transfer slides 318 and the rod 327 is guided by its slots to move in a direction substantially parallel with the grooves 330 in said transfer slides. As shown in Fig. 39, a torsion spring 363 is coiled about the shaft 352 and is secured at one end to a collar 364 which is fixed on said shaft 352 and at its other end, as shown in Fig. 50, presses against a pin 365 projecting from the partition 63. The tension of the spring 363 tends to hold the rod 327 in its forward position with the transfer segments in engagement with their pinions.

The shafts 78, 311 and 352 are rocked and the carriage is returned by an operating mechanism which will now be described.

Referring for the present more especially to Figs. 1, 2 and 39, the shaft 79, to which reference has been made hereinbefore, is the main operating shaft of the adding mechanism, and it extends entirely through said mechanism, being journaled in suitable openings in the frame pieces 57 and 58 and in the partitions 62, 63, 64, and 65. Said shaft has fixed thereon at its left hand end a crank arm or operating lever 366 having at its end a crank handle 367 by which the machine is operated. The operating lever 366 normally stands in the upright position shown in the drawings and the machine is operated by grasping the handle 367 and drawing the same forward and downward through approximately a quarter of a turn and then returning the handle to normal position. Said operating lever has a hub 368 in the periphery of which is formed a segmental notch into which a pin 369 projects from the frame piece 57. The downward motion of the handle is limited by the engagement of a shoulder 370 forming one end of said notch with the pin 369, and the upward motion of the lever is limited in the same way by the engagement of the other end of the notch with said pin. As best shown in Figs. 31 and 39, a segmental rack 371 has a hub 372 which is slidably mounted on the shaft 79 just inside the right hand frame piece 58. A screw 373 extends through the hub 372 and through a longitudinal, elongated slot 374 in the shaft 79. The slot 374 and the pin 373 permits the hub 372 and rack segment 371 to be slid a short distance longitudinally on the shaft 79 but prevent any relative rotation of said rack segment and shaft. The shaft 79 is hollow throughout its length and through the bore 375 of said shaft there extends a rod 376 which terminates at its right hand end in engagement with the screw 374 and at its left hand end projects a short distance beyond the end of the shaft 79. A lever 377 is pivoted to the front face of the operating lever 366 on a shouldered and headed screw 378, and the lower end 379 of said lever 377 is bent into position to engage the end of the rod 376. The upper end of said lever is formed into a thumb piece 380 which normally stands in the position shown in Figs. 1 and 2 just to the right of the end of the operating lever 366 and in position to be pressed by the thumb of the operator when the handle 367 is grasped. A pin 377' is fixed to the operating lever 366 and projects into a slot 377'' in the lever 377, to limit the motion of the latter in both directions. The construction is such that by pressing the end 380 of the lever 377 the rod 376 may be pushed to the right, thus pushing the rack segment 371 to its right hand position. Obviously, other means for moving the segment 371 to its right hand position might be substituted for that here shown and described. It is not necessary that the handle for this purpose be mounted on the operating lever; but I prefer the means here set forth. The handle 367 is operated without pressing the thumb piece 380 when it is desired to add on the register numbers which have been set up on the setting-up wheels. Said thumb piece 380 is used when it is desired to reset the setting-up wheels to zero without affecting the register wheels, which is done either for the purpose of correcting a mistake or in the operation of setting the machine to zero. The rack segment 371 is normally held in its left hand position by a compression spring 381 in the bore 375 of the shaft 79, which spring is compressed between the screw 373 and the end 382 of a depression 383 in a cap 384, which is threaded on to the end of the shaft 79 outside of the frame piece 58.

As shown in Figs. 39, 42 and 44 a bracket 385 is fixed to the partition 65 by screws 386. Said bracket extends sharply to the left as shown and has a downwardly depending arm 387 and midway between said arm 387 and the partition 65, said bracket is also formed with a depending tongue 388. If the handle 367 be pulled down without pressing on the thumb piece 380 the rack segment 371 passes between the arm 387 and the tongue 388 which guides said rack segment and prevents it from being moved longitudinally of the shaft 79 while said shaft is out of normal position; but if the thumb piece 380 be pressed before operating the handle 367, the rack segment 371 will be moved to its right hand position and when the handle is operated said rack segment will pass between the tongue 388 and the partition 65 whereby said segment will be guided and the spring 381 will be prevented from returning it to its left hand position until after the handle 367 has been returned to normal position. In Fig. 44 the arm 387 and the tongue 388 are broken away to more clearly illustrate the parts behind them and it is by reference to this figure that it will be most clearly understood that there are two pinions 389 and 390 one or the other of which is engaged by the segmental rack 371 according as said rack is in its left hand or its right hand position. The pinions 389 and 390 control four cams, 391, 392, 393 and 394. The connection between these pinions and cams will be understood by reference to Fig. 36 which shows the parts in longitudinal section. The pinion 390 is integral with a short shaft 395 and the cam 393 has formed integral therewith a hub 396 which is fastened on said shaft 395 by a pin 397 which passes through said hub and shaft. The hub 396 passes through an opening in the cam disk 394 and said cam disk 394 is secured to the cam disk 393 by a screw or screws 398 passing through said disks. It will be seen therefore that the pinion 390 and the cam disks 393 and 394 are rigidly connected together. The pinion 389 has an elongated hub 399 which is loosely mounted on the shaft 395 between the pinion 390 and the cam disk 393. The cam disk 391 has a hub 400 which is mounted on the hub 399 and fixed thereto by a pin 401 which passes through both of said hubs but does not pass through the shaft 395. The cam disk 392 is mounted on the hub 400 and is fastened to the cam disk 391 by a screw or screws 402 passing through the cam disk 391 and threaded into the cam disk 392. It will thus be seen that the pinion 389 and the cam disks 391 and 392 are all fastened together and are journaled on the shaft 395. When the segmental rack 371 is in its normal or left hand position, it is in position to turn the pinion 389 and the cam disks 391 and 392; but when it is in its right hand position it is in position to turn the pinion 390 and the cam disks 393 and 394. The shaft 395 is journaled at one end in the partition 65 and at the other end in a bracket 403 which is secured to the partition 64 by screws 404 (Fig. 32) and extends in a forward direction. The bracket 403 is offset at 405 (Fig. 32) and projects forward across the end of the shaft 78 and the pinion 280 as shown in Fig. 44, so that the shafts 78 and 395 are in alinement with one another end to end. The pinion 280, standing as it does between the partition 64 and the bracket 403, prevents any endwise motion of the shaft 78.

As best shown in Figs. 40, 41 and 43 the pinion 280 is engaged by an internal toothed, segmental rack 406, which forms part of a rock frame 407, the form of which is clearly shown in Fig. 43. Said rock frame is provided with a shaft or is formed with trunnions 408 which are journaled in the partitions 65 and 64. Two arms 409 and 410 project forwardly from the frame 407 and have on their free ends anti-friction rollers 411 and 412 which engage the peripheries of the cam disks 394 and 391, respectively. The frame is yieldingly held in its normal position shown in Fig. 40 by a spring 411' coiled about the trunnion 408 and pressing against a pin 412' projecting from the partition 65. It will be seen that whether the pinion 389 or the pinion 390 be turned by the rack 371 the segmental rack 406 will oscillate the shaft 78, but the cam disks 394 and 391 are so designed as to operate the segmental rack 406 at different times as will more fully appear hereinafter. The two middle cams 392 and 393 are engaged by a roller 413 journaled in an arm 414 of a rock frame 415 which is illustrated in detail in Fig. 35. Said rock frame has trunnions 416, one of which is journaled in the partition 64 and the other of which is journaled in the lower end of the depending arm 387 of the bracket 385 (see Fig. 42). In Figs. 31, 32, 40 and 41; this bracket is omitted to more clearly illustrate other parts. The rock frame 415 has mounted thereon or formed integral therewith a segmental rack 417 which engages a pinion 418. The pinion 418 is mounted on a shaft 419, which is journaled at its ends in the partitions 64 and 65 and which has fixed thereto near its left hand end a pulley or drum 420, said pulley being fixed to said shaft by a set screw 421 threaded through the hub of the pulley and engaging the shaft. The pulley 420 is grooved and is connected to one end of a band, cord or chain 422 which runs from said pulley downward over a small grooved pulley 423 through the partition 64 and has its other end secured to the carriage 70 at 424 (see Fig. 39). The roller 413 rests over the peripheries of both of the cam disks 392 and 393 each of which is designed to cam said roller outward, moving the segmental rack 417 toward the front of the machine and rotating the pulley or drum 420, and thus drawing the carriage 70 to its right hand position. It will thus be seen that either of the pinions 389 and 390 is connected up to restore the carriage, but the cams 392 and 393 are so designed as to move the follower 413 at different times. In order to avoid placing a sudden strain on the cord or chain 422 I have provided an elastic connection between the pinion 418 and the drum 420, which connection is illustrated in Figs. 33, 34, 37, 38 and 39. The pinion 418 is not fixed on the shaft 419 but is loose thereon and has an elongated hub 425 projecting from the end of which is a segmental lug 426. A hub 427 is fixed on the shaft 419 by a pin 428 passing through said hub and shaft. Said hub has upon its left hand end a segmental lug 429 which projects into position to engage the segmental lug 426; but the two segmental lugs together have a length less than a circumference so that there is a certain amount of freedom of play between them. The hub 427 has projecting therefrom an arm 430 from which projects a pin 431 and to this pin is fastened the outer end of a coiled spring 432, the inner end of which is fastened to the hub 425. Ordinarily the parts all turn together but in case of a sudden or unusual strain on the cord the spring 432 would yield, permitting the pinion 418 to turn without turning the drum 420. In order to conveniently connect the cord or chain 422 to the drum 420, a portion of the periphery of the drum is cut away at 433 and a clamp is secured in the cut away portion. This clamp consists of two pieces of metal 434, the upper ends of which are adapted to be tightened against the cord by a screw 435 passing through one of said pieces and threaded into the other. The pieces 434 straddle the web of the drum 420 and are connected by a pin or rivet 436 which passes through an opening in said web. In order to keep a slight tension on the cord 422 at all times, a spring 437 (Fig. 39) is coiled about the hub 427 and connected at one end to the partition 65. This is a weak spring compared to that in the spring drum 86 and serves merely to keep the cord taut at all times.

The design of the several cam disks 391, 392, 393 and 394 is shown in Figs. 31 and 32, 40 and 41. These figures of the drawings are somewhat irregular sections and in them parts have been omitted or broken away as was found convenient to illustrate the construction. Figs. 40 and 41 are for the most part sections taken just inside the partition 65; but the bracket 385 is omitted altogether and the shaft 419 is shown in section along another line. Figs. 31, 40 and 41 show the cam disks 391 and 392, said disks being shown in Figs. 31 and 40 in normal position and in Fig. 41 in operated position. By reference to these figures it will be seen that the rack 371 is adapted to turn the pinions 389 and 390 through a little less than a complete rotation. In Fig. 32, cam disks 393 and 394 are shown in their normal positions. The disks 393 and 394 would properly show in the other figures also but they have been omitted therefrom in order to avoid confusing the drawings by a multiplicity of lines. By comparing Figs. 31 and 32 for example, it will be seen that when the parts are in their normal position the roller 413 rests on a part of each of the cam disks 392 and 393 which is nearest the center of the shaft 395; that the outline of the disk 392 continues from this point for about 180° on the arc of a circle having its center in the center of the shaft 395; and that from this point the disk expands to a greater radius. The roller 412 rests against the periphery of the disk 391 at a point below the shaft 395 and from this point the outline of the disk is concentric with the shaft 395 for about 90°.

Within about the next 90° the cam rises to its greatest radius and is then formed with a slight drop as shown at 438. From this point on, the outline of the cam is concentric with the shaft. The cam disk 393 has a rise in its first 90° which oscillates the rock frame 415 during the first quarter turn of said cam disk, thus restoring the carriage to its right hand position, after which said frame 415 is stationary. The cam disk 394 is concentric throughout its first 90°, swells to its greatest radius in its second 90°, and is concentric throughout the remainder of its periphery. When the pinion 390 is operated, therefore, during the first quarter turn of said pinion and its cams, the frame 415 is operated, drawing the carriage to its right hand position, and during the second quarter turn, the frame 407 is rocked by the roller 411 on cam 394, oscillating the shaft 78 and resetting the setting-up wheels. As the setting-up wheels are reset after the carriage is withdrawn to its right hand position, the register wheels are not turned by this operation.

In the operation of addition the rock shafts 311 and 352 are oscillated at the proper time by means of a follower arm 440, the anti-friction roller 441 of which engages the cam disk 391 at a point about 90° from the follower 412; that is to say, just at the foot of the rise in said cam, as indicated in Fig. 31. The arm 440 projects downwardly from a rock shaft 442, which as best shown in Fig. 47, has one end passing through the partition 64 and the other journaled in the partition 65. The roller 441 is pressed against the cam disk 391 by a spring 443 coiled about the shaft 442 and pressing at one end against the arm 440 and at the other against a pin 444 projecting from the partition 65. When the disk 391 is turned, the follower 441 is pressed back by the rise in said disk and is allowed to move slightly toward the front of the machine by the drop 438, after which said follower rides on the concentric portion of the cam disk 391 until the end of said concentric portion passes said roller. As will appear hereinafter, it is necessary that the arm 440 should remain in its rear or operated position after this time, as shown in Fig. 41. To this end said arm has a depending plate 445 fixed to one side thereof (see Figs. 45 and 47). When the parts are in their normal position the end of the plate 445 rests just in front of a groove or slot 446 cut in the frame 407 as shown in Fig. 43. When the cam disk 391 begins to turn and the arm 440 begins to move toward the back of the machine the end of the plate 445 passes backward freely through the slot 446 but by the time the end of the cam reaches the roller 441 the frame 407 has been rocked to such an extent that the notch 446 has been moved out of the path of the plate and the plate engages the back of the frame 407 and is held thereby until, on the up-stroke of the operating handle, the frame 407 has rocked back sufficiently to permit the plate 445 to escape through the slot 446.

As will be most clearly understood by reference to Figs. 42 and 44, two detent rollers 447 are mounted on arms 448 and are pressed into engagement with the teeth of the pinions 389 and 390 respectively by springs 449 secured to the bracket 385. The purpose of these rollers is to prevent one of the pinions being turned by friction when the other is operated by the segment 371. As this tendency is greater when the pinion 389 is operated, this pinion being sleeved on the shaft of the other pinion 390, means are provided for positively locking the pinion 390 when the pinion 389 is turned. Said means consists of an arm 450 projecting from the shaft 442 in such position that when said shaft is oscillated said arm 450 engages the arm 448 and locks the roller 447 thus positively preventing any rotation of the pinion 390.

On the left hand side of the partition 64 the shaft 442 has a hub 451 (Fig. 46) mounted thereon and secured thereto by a pin 452 passing through said hub and shaft. This hub has projecting therefrom an arm 453 (Figs. 45 and 46) the free end of which is formed into a segmental cam consisting of two concentric portions connected by a rise 454. The arrangement and operation of the parts coöperating with this cam will be best understood by reference to Fig. 46 and the detail construction of said parts by reference to Figs. 48 and 49, the parts being shown in normal position in Fig. 46. A bracket 455 is secured to the partition 64 and between said bracket and said partition there is fulcrumed a bell crank lever 456 which carries at its free end an anti-friction follower roller 457 which rests in engagement with the cam arm 453 just at the foot of the rise 454. The roller 457 is pressed against the cam arm 453 by a spring 458 coiled about the hub of the bell crank 456 and secured at one end to said bell crank and at the other pressing against the bracket 455. The bell crank 456 has a forwardly extending arm 459 through an elongated slot in which passes loosely the shank of a screw 460 which screw has an elongated head as shown in Fig. 48. The screw 460 is threaded into a plate 461, the rear end of which is forked, forming an elongated slot 462 through which the hub of the bell crank 456 passes. The construction is such that the plate 461 is held to the arm 459 of the bell crank by the bracket 455 at one end and at the other end by the screw 460; but said plate is free to slide on said arm. The forward end of the plate 461 is formed with a nose 463 which normally stands under the free end of an arm 464 which projects backward from the rock shaft 352 to which it is fixed by a pin 465 passing through the hub of said arm and through said shaft. The construction is such that when the shaft 442 is rocked the nose 463 raises the end of the arm 464 and oscillates the shaft 352, which as has been explained hereinbefore, moves the transfer racks out of engagement with the pinions. It is desirable that the transfer racks be returned into engagement with their pinions immediately after the setting-up wheels have been reset and before the carriage has been withdrawn, and I have provided means for operating the parts in this manner. The partition 64 is recessed as shown at 466 and within said recess a lever 467 is fulcrumed on a shouldered and headed screw 468. As shown in Fig. 49, the upper end of this lever has a thickened portion 469 within which is formed a slot or groove 470 into which the screw head 460 extends. This slot is so designed that the head of the screw 460 may move freely therein when the crank arm 456 is oscillated by the cam arm 453; but if the lever 467 be rocked toward the back of the machine it will carry with it the screw 460 and the plate 461 thus withdrawing the nose 463 from under the arm 464 and permitting the rock shaft 352 to be rocked back to its normal position by its spring 363. For this purpose the lower end of the lever 467 has a lug 471 projecting into the path of a pin 472 which is fixed in and projects from the shaft 78. The parts are so designed that as the shaft 78 completes its rocking motion in resetting the setting-up wheels the pin 472 will engage the lug 471 and release the shaft 352. The lever 467 and the plate 461 are restored to normal position with the nose 463 projecting under the end of the arm 464 by a spring 473 which is coiled about the pivot screw 468 within a recess provided for the purpose and connected at one end to the lever 467 and at the other end to the partition 64.

It is necessary that the shaft 352 be first rocked to move the transfer racks out of engagement with their pinions, and, while this shaft is held in its rocked position, the shaft 311 must next be rocked to restore to their lower position any transfer slides which may have been released at a former operation of the machine. When the shaft 442 begins its movement the roller 457 is immediately cammed toward the front of the machine by the rise 454 and its roller is held in this position by the succeeding concentric portion of the cam arm 453. To this cam arm, as shown in Fig. 46, is pivoted a link 474 in the upper end of which is an elongated slot 475 in which plays loosely a screw 476 which is threaded into the free end of an arm 477, the hub 478 of which (Fig. 47) is mounted on the rock shaft 311. The construction is such that during that portion of the motion of the arm 453 during which the roller 457 is being cammed forward, the link 474 is moving downward without affecting the arm 477 until the roller 457, having been cammed out onto the concentric portion of the cam, the end of the slot 475 reaches the screw 476 and the arm 477 is drawn downward rocking the shaft 311. As has been pointed out in the description of the cam 391 and its follower 441, when said cam is turned, the shaft 442 is first rocked outward to an extent governed by the greatest radius of the cam 391 and said shaft then rocks back toward normal position a short distance when the drop 438 is reached. The rock shaft 311 obviously partakes of this movement having an extreme rocking motion imparted thereto, and then returning slightly when the follower 441 passes down the drop 438. The effect of this is to depress the rod 321 below its normal position far enough to permit the plate 334 of any operated trip arm 313 to snap over the lug 317 of the corresponding slide 318, it being understood that whenever any trip 313 has been operated this plate 334 drops to its depressed position. At the time then when the cam 391 begins to depress the follower 412 to rock the shaft 78, the transfer slides have all been reset and the transfer mechanism stands in the position shown in Fig. 51 except that the transfer racks are out of mesh with the pinions.

The rock shaft 311 is released to permit its spring 349 to return it to normal position when the operating handle reaches the limit of its downward motion. To this end the hub 478 is not itself fixed on the shaft 311 but forms one member of a clutch the other member of which is a sliding sleeve 479 (Fig. 47). Said sleeve 479 has on one end thereof clutch teeth 480 which are adapted to mesh with corresponding notches or depressions in the end of the hub 478. Said sleeve has a longitudinal elongated slot 481 into which a pin 482 projects from the shaft 311 so as to leave said sleeve free to slide longitudinally of the shaft but so as to prevent relative rotation of said sleeve and shaft. The sleeve 479 is formed with an annular groove 483 into which extend the branches of a forked arm 484 of a bell crank lever 485 which is fulcrumed at 486 in a bracket 487 secured to the partition 64. The free end of the horizontal arm of the bell crank 485 is pivotally connected at 488 to a link 489 the irregular shape of which is shown in Figs. 46 and 47. The lower end of said link is pivotally connected at 490 with a lever 491 which is fulcrumed on a shouldered and headed screw 492 which is threaded into the partition 64. The forward end of the lever 491 extends into the path of an arm 493, the hub 494 of which is mounted on the operating shaft 79 and is fixed thereon by a set screw 495. The parts are so designed that the arm 493 engages the end of the lever 491 and operates the same the last thing in the downward motion of the operating handle, with the result that the link 489 depresses the horizontal arm of the bell crank 485 and moves the sleeve 479 to the left thus disconnecting the two members of the clutch and leaving the rock shaft 311 free to return to normal position under the impulse of its spring 349. When the parts return to normal position on the elevation of the operating handle the sleeve 479 is moved to the right to bring the clutch members back into engagement by a spring 496 coiled about the shaft 311 and compressed between the sleeve 350 and the sleeve 479.

The operation of the machine in writing and adding numbers will be understood from what has been said above. If it is desired to write numbers in columns and to automatically add the same, the contact block 188 is moved to a position on the bar 160 corresponding to the position in the line of writing in which it is desired that the adding column shall be and the stop 32 is placed correspondingly on the tabulator bar 30. Some or all of the rings 190 are turned with their lugs 191 to operative position, the number of such rings which are placed in operative position depending upon the width of adding column which it is desired to use. The typewriting machine is then operated in the ordinary way, any desired matter being written on either side of the adding column and the carriage being brought to any desired denominational position in the adding column by the use of the tabulator in the ordinary manner. As long as the carriage is in position to print in the adding column the segments 124 and 128 are in engagement and the adding mechanism is in operation. In case, however, it is not desired to write the numbers in columns but it is preferred to add numbers wherever written in the line of writing, the segments are connected up whenever it is desired to bring the adding mechanism into operation and are disconnected whenever it is desired to write numbers without affecting the adding mechanism by manipulation of the thumb nut 151, the milled head 181 being turned to throw the carriage connection out of operation. The adding mechanism being in operation, the numeral keys of the typewriter are depressed to write a number in the ordinary manner. Each depression of the numeral key results in stepping the selector carriage 70 along in the manner which has been described and each depression of any numeral keys except the "0" key results in the setting-up of the appropriate setting-up wheel. It will be understood that any desired punctuation marks, such as commas and the decimal point may be used in writing the numbers, as the keys which print such characters have no effect on the adding mechanism. When a number has been set up the indicator wheels are visible to the operator through the openings 308 in the casing 306. If upon inspection of said indicator wheels it is found that the number is set up correctly, the operating handle is moved down and back again with the result that the segment 371 turns the pinion 389 and cams 391 and 392 through somewhat less than a complete turn. The first quarter turn rocks the arm 440, shaft 442 and cam arm 453 to their extreme forward positions and then permits said parts to move slightly back. The first part of the forward oscillation of the arm 453 rocks the shaft 352 and moves the transfer racks out of engagement with their pinions. The second part of such forward oscillation depresses the transfer slides past their normal positions far enough to permit the plates 334 to catch over the tops of the lugs 317 and the slight return motion of the parts permits the transfer slides to move up to their normal position. The second quarter turn of the pinion 389 and the cam disks 391 and 392 rocks the frame 407, thereby rocking the shaft 78 and resetting the setting-up wheels thus turning the register wheels in accordance with the numbers which have been set up. The pin 472 engaging the lug 471 then releases the shaft 352 and permits the transfer racks to reëngage their pinions. When the drop 438 in the cam 391 reaches the follower 412, said follower and the shaft 78 oscillate back a short distance toward normal position. The effect of this is to let each of the setting-up wheels turn back until the tension of its spring is taken by its retaining pawl 239, and the key 282 is relieved of the pressure due to said springs. If said key were not thus relieved of such pressure, it would cause a great deal of friction when the carriage was withdrawn to its right hand position. The next quarter of the forward turn of the pinion and cam disks oscillates the frame 415 and draws the carriage back to its right hand position; the arm 493 then oscillates the lever 491 and releases the rock shaft 311 which permits the rod 321 to rise and release the transfer mechanism for operation by the springs 322. The handle and the parts connected thereto are then returned to normal position. If, upon inspection of the indicator it is found that the wrong number has been set up on the setting-up wheels, the thumb piece 380 is pressed, thus moving the segment 371 into engagement with the pinion 390 and the handle is operated as before, thus turning the pinion 390 and the cam disks 393 and 394. The first quarter turn of these cam disks draws the carriage back to its right hand position and second quarter turn resets the setting-up wheels to zero without affecting the adding mechanism.

In order to reset the register wheels to zero and to restore the adding mechanism to its initial position ready to begin the addition of a new column of figures the carriage 70 is moved to its extreme left hand position by pressing the button or key 228 and thus releasing the carriage from its escapement mechanism in the manner which has been described hereinbefore. The transfer racks are then withdrawn from the pinions 303 and the transfer slides reset. The setting-up wheels 232 are then all released from their retaining dogs 239 by rocking the shaft 240 toward the back of the machine, the racks 233 being then in engagement with the pinions 303 and the racks, pinions and register wheels are turned by the springs 237 until the transfer tooth of each register wheel encounters the lug 314 of the transfer lever 313 in which position the register wheels stand at zero, and the number which had been displayed by said register wheels will then be displayed upon the indicator wheels 235. The transfer racks are then moved back into engagement with the pinions 303, the carriage is withdrawn to its left hand position and the setting-up wheels are reset. The restoration of the carriage and the resetting of the setting-up wheels are performed by pressing the thumb piece 380 and operating the operating handle, but I have provided special mechanism for moving the transfer racks and resetting the transfer slides in this operation.

The special mechanism which is used for controlling the transfer mechanism and for releasing the setting-up wheels in the operation of resetting the register to zero is best illustrated in Figs. 52 to 57 inclusive. This mechanism includes a handle 497 fixed to the end of a lever 498 which projects through a slot in the top of the casing of the machine and stands normally in the position shown in Figs. 52 and 55. At its inner end this lever has an opening by which it is pivotally mounted on the rod 291. The lever 498 has fixed thereto two cam disks 499 and 500 the former of which is pivoted on the rod 291 on the left and the latter of which is pivoted on said rod on the right hand side of said lever. The system comprising the lever and the two cam disks occupies the space between the bracket 300 and the partition 62. The lever and its cam disks are pressed toward their normal position by a spring 501 (Fig. 55) coiled about the rod 291 in an annular recess formed for the purpose in the partition 62, one end of said spring being connected to said partition and the other end to the disk 499. The lever 353 which is fixed to the rock shaft 352 has an upwardly extending arm 502 the end of which normally rests against the periphery of the disk 499, at the foot of a rise 503. At about 180° from the rise 503 the periphery of the disk 499 is formed with a second rise 504 and the portion of such periphery between the top of the rise 503 and the foot of the rise 504 is concentric with the rod 291. A lever 505 is pivoted on a screw 506 which is threaded into the partition 62 and at its upper and forward end this lever has mounted thereon an anti-friction roller 507 which lies against the concentric portion of the periphery of the disk 499. The rock shaft 240 on which the retaining dogs 239 are pivoted extends through the left hand end piece 72 of the carriage 70 and has fixed thereon an arm 508 which, when the carriage occupies its extreme left hand position as shown in Fig. 55, stands in the path of the lower end of the lever 505. The arm 508 normally stands in contact with a pin 509 against which it is pressed by a spring 510 (Fig. 50) which is coiled about the rock shaft 240 at the extreme right hand end of said shaft where it projects through the right hand end frame piece 71 of the carriage 70. The spring 510 is connected at one end to the rock shaft 240 and at its other end presses against the projecting end of the bar 77.

It will be seen that if, when the carriage occupies its extreme left hand position, the handle 497 be pushed toward its operated position shown in Fig. 53, the first effect of such motion will be to cam the arm 502 toward the front of the machine rocking the rock shaft 352 and pushing the rod 356 toward the back of the machine, said rod in such motion carrying with it the transfer racks 328, thus disengaging said racks from the pinions 303. When the rise 504 reaches the anti-friction roller 507, the forward end of the lever 505 will be depressed and the backward or lower end of said lever will press the arm 508 toward the back of the machine, rocking the shaft 240 and moving all of the retaining pawls 239 out of engagement with the ratchets 241.

The periphery of the cam disk 500 is formed with a projection 511 from the foot of which the outline of the disk is concentric with the rod 291 for a short distance as shown in Figs. 52 and 53, after which said periphery is formed with a rise 512 from the summit of which the remainder of the outline of the disk is concentric with the rod 291. In the recess at the base of the projection 511 normally rests an anti-friction roller 513 mounted on the end of an arm 514 projecting from a hub 515 (Fig. 57) fixed to the eccentric sleeve 312 on which the transfer levers 313 are pivotally mounted. As has been explained hereinbefore, the rock shaft 311 has fixed thereon a hub 339 from which projects an arm 340 to which the link 341 which carries one end of the rod 321 is pivoted. As will be best understood by reference to Figs. 56 and 57, the hub 515 is formed with a part 516 projecting over the hub 339 and arm 340. When the shaft 311 is rocked by the operating mechanism in the ordinary operation of the machine the sleeve 312 does not partake of the motion of the shaft 311; but when the handle 497 is pushed backward in the operation of setting the register to zero the hub 515 by its projection 516 engaging the arm 340 rocks the shaft 311 with the eccentric sleeve 312 said hub 515 being fixed to said sleeve. The effect of the rocking of the shaft 311 is to restore to normal position any of the transfer slides 318 which may have been moved to operated position in the operation of addition. By an inspection of Figs. 52 and 53 it will be perceived that the cam disks 499 and 500 are so designed that when the handle 497 is pushed toward the back of the machine the shaft 352 is first rocked disengaging the transfer racks 328 from the pinions 303 and then the shaft 311 is rocked to restore the slides 318 to normal position, the rocking of the shaft 240 to release the setting-up wheels being the last of all. When the carriage is in its extreme left hand position all of the setting-up members 232 have their rack teeth in engagement with the pinions 303 and when the rock shaft 240 is rocked by the lever 505 pressing against the arm 508, these setting-up members are released and each turns under the impulse of its spring 237, turning the corresponding register wheel until the transfer tooth 310 is arrested by the lug 314 projecting from the transfer lever 313. Each register wheel will thus be turned backward a number of units of rotation corresponding to the digit which said wheel indicated at the time; and each of the setting-up members 232 and its corresponding indicator wheel 235 will be turned forward to the same extent with the result that the register wheels will all be set to zero and the total which was indicated on said register wheels will be transferred to the indicator wheels 235. The effect of the rocking of the sleeve 312 by means of the handle 497 is to move all of the transfer levers 313 slightly toward the front of the machine the purpose of its movement being to take up any lost motion which there may be in the train of gearing consisting of the pinions 297 and 303 and the rack 233.

The operation of the mechanism which has been described is as follows: The carriage having been brought to its extreme left hand position shown in Fig. 55 the handle 497 is pushed to its operated position shown in Fig. 53 and is drawn back again to normal position or is allowed to return to normal position under the impulse of the spring 501. When the handle 497 is pushed back to its operated position the transfer racks 328 are disconnected from their pinions 303, the arm 514 is then moved toward the back of the machine oscillating the sleeve 312 thus pushing the arms 313 forward and also oscillating the shaft 311 and thereby restoring the transfer slides 318; the shaft 240 is then rocked releasing the setting-up elements 232 whereupon the register wheels are set to zero by the springs 237. After the handle 497 has been returned to its normal position shown in Fig. 52 the thumb piece 380 is pressed to the left and the operating handle 367 is operated in the manner which has been described. The result of this operation of the handle 267 is, as has been explained hereinbefore, to first withdraw the carriage to its initial or normal right hand position and to then reset the setting-up mechanism to zero.

What I claim as new and desire to secure by Letters Patent, is:—

1. In an adding machine, the combination of a key lever, adding mechanism and an adjustable connection between said key lever and said adding mechanism including a lever 98 pivotally connected to said key lever, the set screws 103 for adjustably holding said lever 98 in fixed relation to the key lever and the link 96 connecting said lever 98 to said adding mechanism.

2. In a writing and adding machine, the combination of a group of numeral keys; printing means actuated by said keys; a carriage and a platen, of adding mechanism controlled by said numeral keys and having a universal bar operatable by any of said keys, said universal bar being movable through substantially the same distance by the different keys; and means for connecting said universal bar to and disconnecting it from said adding mechanism.

3. In a writing and adding machine, the combination with the group of numeral keys, the printing means actuated thereby, the carriage, and the platen, of adding mechanism controlled by said numeral keys; a universal bar operatable by any of said numeral keys, said universal bar being movable through substantially the same distance by the different keys; and means controlled by said carriage for connecting said universal bar to and disconnecting it from said adding mechanism.

4. In an adding machine, the combination of numeral keys; a universal bar for said numeral keys; a pivoted lever 131, having lever 129 pivoted thereto, means for moving said lever 131 about its pivot to bring said lever 129 into or out of operative connection with said universal bar; and adding mechanism controlled by said lever 129.

5. In a writing and adding machine, the combination with the keys including numeral keys, the key actuated printing means, the carriage, and the step-by-step feed device therefor, of adding mechanism having a denomination selecting device, a separate step-by-step mechanism for said denomination selecting device, and means controlled by said carriage for making said step-by-step mechanism operatable by the numeral keys during a predetermined portion of the line of writing.

6. In a writing and adding machine, the combination with the keys including numeral keys, the key actuated printing means, the carriage, and the step-by-step feed device therefor, of adding mechanism having a denomination selecting device, a separate step-by-step mechanism for said denomination selecting device, and means controlled by said carriage for making said step-by-step mechanism operative by the numeral keys during any desired portion of the line of writing.

7. In a writing and adding machine, the combination with the keys including numeral keys, the key actuated printing means and the carriage of the writing mechanism, of adding mechanism; a part movable to different positions to operatively connect the adding mechanism to the numeral keys or to disconnect the same; carriage controlled means for moving said movable part to operative position during a predetermined portion of the line of writing, and hand operated means for moving said part to operative position irrespective of the position of the carriage.

8. In a writing and adding machine, the combination with the keys including numeral keys, the key actuated printing means and the carriage of the writing mechanism, of adding mechanism capable of operation independently of said carriage; a part movable to different positions to operatively connect said adding mechanism to said numeral keys or to disconnect the same; and hand operated means for controlling said movable part irrespective of the position of the carriage.

9. In a writing and adding machine, the combination with the keys including numeral keys, the key actuated printing means and the carriage of the writing mechanism, of adding mechanism; carriage controlled means for bringing said adding mechanism into and out of operation by the numeral keys, and hand operated means for bringing said adding mechanism into and out of operation by the numeral keys independently of the carriage.

10. In a writing and adding machine, the combination with the keys including numeral keys, the key actuated printing means, the carriage and the step-by-step feed device therefor, of adding mechanism having a denomination selecting device, a separate stepby-step mechanism for said denomination selecting device, and means controlled by said carriage for making said step-by-step mechanism opertable by the numeral keys during a predetermined portion of the line of writing.

11. The combination with the carriage, the keys and the key controlled printing means of a typewriting machine, of an adding mechanism normally out of operative connection with the numeral keys of said typewriting machine, means controlled by said carriage for rendering said adding mechanism operative in connection with said numeral keys at a predetermined portion of the line of writing, hand operated means for rendering said adding mechanism operative in connection with said numeral keys irrespective of the position of the carriage, and hand operated means for rendering said carriage controlled means inoperative.

12. In a writing and adding machine, the combination with the keys including numeral keys, the key actuated printing means, the carriage and the step-by-step feed device therefor, of adding mechanism having a denomination selecting device, a separate step-by-step mechanism for said denomination selecting device, and means controlled by said carriage for making said step-by-step mechanism operable by the numeral keys during a predetermined portion of the line of writing, said means being adjustable to vary the position in the line of writing during which said step-by-step denomination selecting device is operative.

13. In a writing and adding machine, the combination with the keys, including numeral keys and other keys, the printing means actuated by said keys, and the carriage, of adding mechanism, a universal bar arranged to be operated by any of the numeral keys but not by the other keys, said universal bar being movable through substantially the same distance by the different keys, and means controlled by said carriage for operatively connecting said universal bar to said adding mechanism.

14. In a writing and adding machine, the combination with the keys, including numeral keys, the key actuated printing means and the carriage, of a universal bar operable by any of the numeral keys; adding mechanism; and means connecting said universal bar with said adding mechanism, said connecting means including a carriage controlled clutch device.

15. In a writing and adding machine, the combination with the keys, including numeral keys, the key actuated printing means and the paper carriage, of an adding mechanism having a selector carriage; an escapement mechanism for said selector carriage, and means controlled by the paper carriage for bringing said escapement into operative connection with the numeral keys.

16. In a writing and adding machine, the combination with the keys, including numeral keys, the key actuated printing means and the carriage, of a universal bar operated by any of said numeral keys; adding mechanism; a clutch connection between said universal bar and said adding mechanism; a carriage controlled arm 173 for controlling said clutch connection; and hand operated means for making said arm 173 inoperative.

17. In an adding machine, the combination of a group of numeral keys; a universal bar operatable by any of said keys, adding mechanism including a carriage; a step-by-step feed device for said carriage controlled by said universal bar; and means for disconnecting said universal bar from said step-by-step feed device.

18. In an adding machine, the combination of numeral keys, a universal bar for said numeral keys; a pivoted lever 131, having lever 129 pivoted thereto; a hand operated member 152 for controlling said lever 131 to move said lever 129 into or out of operative connection with said universal bar; and adding mechanism controlled by said lever 129.

19. In a writing and adding machine, the combination with the keys, including numeral keys, the key actuated printing means and the carriage, of a universal bar for said numeral keys; a pivoted lever 131, having lever 129 pivoted thereto; carriage controlled means for moving said lever 131 to bring said lever 129 into or out of operative connection with said universal bar; and adding mechanism controlled by said lever 129.

20. In a writing and adding machine, the combination with the keys, including numeral keys, the printing means actuated by said keys, and the carriage, of mechanism for adding numbers written by said printing means in a plurality of denominations, mechanical connection between said numeral keys and said adding mechanism, and mechanical means for automatically bringing said adding mechanism under the control of said numeral keys by the travel of the carriage, the mechanism including means that can be regulated to cause the adding mechanism to be brought under the control of the numeral keys during one only or during more than one letter space portion of the travel of the carriage as may be desired.

21. In a writing and adding machine, the combination with the keys, including numeral keys, the printing means controlled thereby and the carriage, of means for automatically adding numbers written by said printing means in a plurality of denominations, mechanical connections between said numeral keys and said adding mechanism, and mechanical means for automatically bringing said adding mechanism into operation during a predetermined portion of the travel of the carriage, said means being capable of regulation to vary the number of denominations in which numbers may be written and automatically added.

22. In a writing and adding machine, the combination with the keys, including numeral keys, the printing means actuated thereby and the carriage, of means for automatically adding numbers written by said printing means in a plurality of denominations, mechanical connections between said numerals keys and said adding mechanism, mechanical means for automatically bringing said adding mechanism into operation during a predetermined portion of the travel of the carriage, thus defining an adding column, said means including means whereby the number of denominations included in said adding column may be varied.

23. In a writing and adding machine, the combination with the keys, including numeral keys, the printing means actuated thereby, and the carriage, of mechanical means for automatically adding numbers written by said printing means in a plurality of denominations, mechanical means for automatically bringing said adding mechanism into operation during certain predetermined letter space positions of the carriage corresponding to different denominations to be written and added, said means including means whereby the number of denominations in which numbers may be automatically added may be varied.

24. In a writing and adding machine, the combination with the keys, including numeral keys, the key actuated printing means, the carriage and the step-by-step feed device therefor, of adding mechanism having a denomination selecting device, a step-by-step mechanism for said denomination selecting device, and means controlled by said carriage for making said step-by-step mechanism operative by the numeral keys during a predetermined portion of the line of writing, said means being adjustable to vary length of the portion of the line of writing during which said denomination selecting device is operative.

25. In a writing and adding machine, the combination with the keys, including numeral keys, the key actuated printing means, the carriage, and the step-by-step feed device therefor, of adding mechanism having a denomination selecting device, a step-by-step mechanism for said denomination selecting device, and means controlled by said carriage for making said step-by-step mechanism operative by the numeral keys during a predetermined portion of the line of writing, said means being adjustable to vary the position in the line of writing on which said denomination selecting device is operative and also capable of being changed to vary the length of the portion of the line of writing during which said denomination selecting device is operative.

26. In a writing and adding machine, the combination with the keys, including numeral keys, the printing means actuated thereby and the carriage, of adding mechanism including a part movable to one position to render said adding mechanism operative in connection with said numeral keys and to another position to render said adding mechanism inoperative in connection with said numeral keys, means whereby said carriage at a predetermined point in the travel thereof moves said part to operative position and positively maintains said part in operative position through a predetermined number of letter space movements of said carriage, said means being adjustable to vary the portion of the line of writing in which said part is maintained in operative position.

27. In a writing and adding machine, the combination with the keys, including numeral keys, the printing means actuated thereby and the carriage, of adding mechanism including a part movable to one position to render said adding mechanism operative in connection with the numeral keys and to another position to render said adding mechanism inoperative, and means whereby said carriage at a predetermined point in the travel thereof moves said part to operative position and maintains the same in such position through a predetermined number of letter space movements of said carriage, said means being capable of variation to vary the number of letter space positions during which said part is held in operative position.

28. In a writing and adding machine, the combination with the keys, including numeral keys, the printing means actuated thereby and the carriage, of adding mechanism including a part movable to one position to render said adding mechanism operative in connection with said numeral keys and to another position to render said adding mechanism inoperative, and means whereby said carriage at a predetermined point in the travel thereof moves said part to operative position and maintains it in such position through a predetermined number of letter space movements of said carriage, said means being adjustable to vary the point in the travel of the carriage at which said part is moved to operative position and also capable of being changed to vary the number of letter space movements of the carriage through which said part is held in operative position.

29. In a combined typewriting and adding machine, the combination with keys including numeral keys, key controlled printing means and the carriage, of mechanism for adding numbers written by said printing means in a plurality of denominations, and connections whereby said adding mechanism is brought under the control of said numeral keys during a portion of the travel of the carriage, said connections including a series of members, each settable to an operative and to an inoperative position, whereby the number of denominations in which numbers written and added, may be varied.

30. In a combined typewriting and adding machine, the combination with the keys including numeral keys, key controlled printing means and the carriage, of means for adding numbers written by said printing means in a plurality of denominations, and connections whereby said adding mechanism is brought under the control of said numeral keys during a predetermined portion of the travel of the carriage, said connections including a series of contact pieces each settable to an operative and to an inoperative position, and a wiper coöperating with such contact pieces as are in operative position whereby the number of denominations in which numbers may be written and added may be varied.

31. In a combined typewriting and adding machine, the combination with the keys including numeral keys, the key controlled printing means and the carriage, of mechanism for automatically adding numbers written by said printing means in a plurality of denominations, and connections for automatically bringing said adding mechanism into operation by said numeral keys during a predetermined portion of the travel of the carriage, said connections including a series of contacts, each independently settable to an operative and to an inoperative position, and a wiper coöperating with said contacts, one of said connecting parts being mounted on the carriage and one of said parts being adjustable to the direction of the travel of the carriage whereby the adding mechanism may be brought into operation by the numeral keys at different portions of the line of writing and also through different numbers of letter space positions of the carriage.

32. In an adding machine, the combination with a series of register wheels, of a series of setting-up elements, a group of keys common to all of said setting-up elements; means for setting up numbers on said setting-up elements one after another as the keys are operated beginning with the setting-up element of the highest denomination, and denominational keys and connections for determining the denominational value of said setting-up element of highest denomination.

33. In a writing and adding machine, the combination with the keys, including numeral keys, the key actuated printing means, the carriage and the step-by-step feed device therefor, of adding mechanism having a denomination selecting device, a separate step-by-step mechanism for said denomination selecting device; means controlled by said carriage for making said step-by-step mechanism operative by the numeral keys during a predetermined portion of the line of writing; and a tabulator for bringing the carriage to position to make said step-by-step mechanism operative.

34. In a writing and adding machine, the combination with the keys including numeral keys, the key actuated printing means and the carriage of the writing mechanism, of adding mechanism including a carriage and means whereby said carriage is capable of being moved step-by-step under the control of said numeral keys; a part movable to either of two positions in one of which the keys are inoperative to control the carriage of the adding mechanism; means whereby when said part is in the other of said positions said keys cause said carriage of the adding mechanism to move step-by-step through a plurality of denominational positions; and means controlled by the carriage of the writing mechanism for moving said movable part to one or the other of said two positions.

35. The combination of a series of keys; a carriage; a series of indicators mounted on said carriage; a locking device for each indicator; means for releasing one of said locking devices by the depression of a key, the locking device which is released depending upon the position of the carriage; and means for imparting a step-by-step movement to said carriage as the keys are operated.

36. The combination of a series of keys; a carriage; a series of indicators mounted on said carriage; a locking device for each of said indicators; keys means controlled by the depression of a key for releasing said locking devices one at a time; means controlled by the same key depression for determining the extent of motion of said indicators when released; and means for imparting a step-by-step movement to said carriage as the keys are operated to bring said indicators one after another into operative relation with said key controlled devices.

37. The combination of a series of keys, a carriage, a series of indicators mounted on said carriage, a series of locks one for each of said indicators, key controlled means for releasing said locks one at a time, and means for imparting a step-by-step movement to said carriage as the keys are operated to bring said locking devices one after another into operative relation with said releasing means, said locks being released by key depressions when the carriage is stationary.

38. The combination of a series of keys, a carriage, a series of indicators mounted on said carriage, a motor for each of said indicators, key controlled means for bringing said motors into operation one at a time and for determining the extent of motion imparted to the indicators thereby, and means for imparting a step-by-step movement to said carriage to bring the indicating devices one after another into coöperative relation with said key controlled devices.

39. The combination of a group of keys, a series of indicators, a series of setting up devices controlling said indicators, a motor for each of said setting up devices, key controlled means for controlling the operation of any of said setting up devices by its motor, and means for bringing any of said setting up devices into coöperative relation with said key controlled means; a register; and means for adding on said register the numbers set up on said setting up devices and shown by said indicators.

40. The combination of a series of registering elements, a series of setting up devices, a motor for each of said setting up devices, a group of keys, key controlled means for controlling the operation of said setting up devices by their motors, means for bringing said setting up devices one at a time into coöperative relation with said key controlled means, and means for operating said registering elements to add thereon the numbers set up on said setting up devices.

41. The combination of a series of registering elements, a group of keys, a carriage, a series of setting up devices mounted on said carriage, a motor for each of said setting up devices, key controlled means for controlling the operation of said setting up devices by their motors, means for imparting a step-by-step movement to said carriage to bring said setting up devices one after another into coöperative relation with said key controlled devices, and means for operating said registering elements in accordance with the numbers set up on said setting up devices.

42. The combination of a series of registering elements, a carriage, a series of setting up devices mounted on said carriage, means on said carriage for operating said setting-up devices, means for controlling said setting-up elements one at a time, means for imparting a step-by-step movement to said carriage from right to left to bring said setting up devices one after another into coöperative relation with said controlling means, a series of indicators coöperating with said setting up devices to indicate the numbers set up thereon, and means for operating said register in accordance with the numbers set up on said setting up devices and indicated on said indicators.

43. The combination of a series of register wheels, a carriage, a series of setting up devices mounted on said carriage and each having its own motor spring, means for controlling the operation of said setting up devices by their motor springs one at a time, means for imparting a step-by-step movement to said carriage to bring said setting up devices one after another into coöperative relation with said controlling means, and means for operating said register wheels in accordance with the numbers set up on said setting up devices.

44. The combination of a carriage having a series of rotary setting up devices mounted therein, a shaft along which said carriage slides, and a member which is splined to said shaft to rotate therewith, which moves with said carriage along said shaft and resets said setting-up devices when said shaft is turned.

45. In an adding machine, the combination of the rock shaft 78 having a longitudinal groove therein; the carriage having the sleeve 73 which moves along said shaft 78; the rotary setting-up elements 232, journaled on said sleeve and having notched hubs; and the spline 282, which slides in said groove and has projections 283 extending through openings in said sleeve and entering the notches in said hubs.

46. In an adding machine, the combination of register wheels; a group of keys; a carriage, a series of indicating devices mounted in said carriage; key controlled means for setting up said indicating devices one at a time and imparting a step-by-step feed to said carriage to bring the indicators into gear with the register wheels, and an operating mechanism which, after a number has been set up on the indicating devices, may be caused either to add such number on the register wheels first and then to withdraw said carriage to move the indicators out of gear with the register wheels, or to withdraw said carriage first and then to restore said indicating devices without affecting the register wheels.

47. In an adding machine, the combination of a series of keys; a series of reciprocatory slides actuated by said keys; a stop on each of said slides; a carriage having a series of setting-up elements mounted therein; a stop on each of said setting-up elements; means for actuating said setting-up elements; retaining means for said setting-up elements; means for imparting a step-by-step feed to said carriage as the keys are operated; and means for releasing that setting-up element whose stop is in position to be arrested by one of the stops on the slides.

48. In an adding machine, the combination of a series of keys; a carriage; key controlled means for imparting a step-by-step movement to said carriage; and an operating mechanism including a cam, a follower for said cam, and means including a yielding connection, whereby said follower restores said carriage.

49. In a writing and adding machine, the combination with a series of keys including numeral keys, printing means actuated thereby and a carriage, of adding mechanism including a series of motor actuated setting-up devices, detents for said setting-up devices, a trip for said detents, and carriage controlled means for making said trip operative or inoperative by the numeral key.

50. In a writing and adding machine, the combination with the keys including numeral keys, the key controlled printing means and the carriage, of adding mechanism, including a series of motor actuated setting-up devices, detents for said setting-up devices, a trip for said detents, and hand operated means for making said trip operative or inoperative by the numeral keys.

51. In a writing and adding machine, the combination with the keys including numeral keys, the key controlled printing means and the carriage, of adding mechanism including a series of motor actuated setting-up devices, detents for said setting-up devices, a trip for said detents, carriage controlled means for making said trip operative or inoperative by the numeral keys during a predetermined portion of the travel of the carriage, and hand operated means for making said trip operative or inoperative by the numeral keys irrespective of the position of the carriage.

52. In a writing and adding machine, the combination with the keys including numeral keys, the key actuated printing means and the carriage, of adding mechanism including a series of motor actuated setting-up devices, controlled means for making said detents operative or inoperative by the numeral keys, and hand operated means for throwing said carriage controlled means out of operation.

53. In a writing and adding machine, the combination with the keys, including a zero key and the key controlled printing means, of means for automatically adding numbers written by said printing means, said adding means including motor actuated devices, a releasing device for said motor actuated devices, and means controlled by the zero key for throwning said releasing device out of operation.

54. In a writing and adding machine, the combination with the keys including numeral keys, one of which is a zero key, and key controlled printing means, of means for automatically adding numbers printed by said printing means, said adding means including motor actuated devices, and a step-by-step device, means controlled by any of the numeral keys for actuating said step-by-step device, a key controlled releasing device for said motor actuated devices, and means controlled by the zero key for throwing said releasing device out of operation.

55. In an adding machine, the combination of a series of numeral keys including a zero key, a carriage, a universal bar, a carriage escapement mechanism operated by said universal bar, setting-up devices mounted on said carriage, means for retaining said setting-up devices in normal position, means operated by said universal bar for releasing said setting-up devices one at a time, and means controlled by said zero key for disconnecting said releasing means from said universal bar.

56. In an adding machine, the combination of a series of keys including a zero key, a universal bar operated by any of said keys, setting-up devices, means operated by said universal bar for releasing said setting-up devices one at a time as the keys are depressed, and means controlled by the zero key for disconnecting said releasing means from said universal bar.

57. In an adding machine, the combination of a carriage, a series of setting-up devices mounted therein, a series of keys, a series of key controlled slides each having a stop for arresting said setting-up devices, a universal bar operated by any of said keys, and carriage escapement mechanism and a releasing device for said setting-up devices actuated by said universal bar.

58. In an adding machine, the combination of a series of keys, a series of register wheels arranged transversely across the machine, a series of key controlled slides arranged parallel with said series of register wheels, a universal bar arranged to be operated by any of said slides and setting-up devices controlled by said universal bar.

59. In an adding machine, the combination of a series of register wheels, a series of setting-up racks movable into and out of gear with said register wheels, a series of transfer racks movable into and out of gear with said register wheels, and an operating mechanism which first moves said transfer racks out of gear with said register wheels, then operates said setting-up racks to turn said register wheels in accordance with numbers to be added, then returns said transfer racks into gear with said register wheels and then moves said setting-up racks out of gear with said register wheels; and means for operating said transfer racks.

60. In an adding machine, the combination of a series of register wheels; a series of setting up racks, movable into and out of gear with said register wheels, a series of transfer racks movable into and out of gear with said register wheels, an operating mechanism which moves said transfer racks out of gear with said register wheels, then operates said setting-up racks to turn said register wheels in accordance with numbers to be added thereon, then returns said transfer racks into gear with said register wheels and then moves said setting up racks out of gear with said register wheels; springs for operating said transfer racks; and means for controlling the operation of said transfer racks under the impulse of said springs.

61. In an adding machine, the combination of a series of register wheels, a series of transfer racks movable into and out of gear with said register wheels, a series of spring driven slides for controlling said transfer racks, an operating mechanism for moving said transfer racks simultaneously into and out of gear with their respective register wheels, and resetting such of said transfer racks as have been operated; and means for controlling the operation of said slides under the impulse of their springs.

62. In an adding machine, the combination with a series of register wheels, of a series of setting up racks mounted in a carriage, a group of keys common to all of said setting up racks, key controlled means for setting up said racks one at a time and for imparting a step-by-step movement to said carriage, a series of spring actuated transfer racks movable into and out of gear with the register wheels; and operating mechanism for moving said transfer racks out of gear with the register wheels, resetting said setting up racks and thus turning the register wheels in accordance with the numbers set up on said racks, returning said transfer racks into gear with the register wheels and restoring the carriage to initial position; and means for controlling the motion of said transfer racks under the impulse of their springs.

63. In an adding machine, the combination with a series of register wheels, and a series of transfer racks one of said series being movable into and out of gear with the other, spring means for holding said wheels and racks in gear one with the other, and an operating mechanism including means for moving one of said series out of gear with the other against the tension of said spring means, and means for releasing said series from said operating mechanism, and permitting it to return into gear with the other series under the impulse of said spring means.

64. In an adding machine, the combination with a series of register wheels, and a series of transfer racks one of said series being movable into and out of gear with the other, of a rock shaft controlling said movable series, an operating mechanism including means for rocking said rock shaft to move said movable series out of gear with said fixed series, a trip for releasing said rock shaft from said operating mechanism, and a spring for returning said rock shaft to normal position.

65. In an adding machine, the combination of a series of register wheels arranged side by side along a common axis; pinions 297 connected to said register wheels; plates 298 interposed between adjacent wheels; pinions 303 supported by said plates 298; and racks 233 mounted to move in a direction parallel to the axis of the register wheels into and out of engagement with said pinions 303.

66. In an adding machine, the combination of a series of register wheels; transfer racks pivoted on a rod and arranged to gear with said register wheels; and means for moving said rod to move said racks into and out of gear with said register wheels.

67. In an adding machine, the combination of a frame; a series of register wheels mounted in said frame; transfer racks pivoted on a rod and arranged to gear with said register wheels; means for moving said rod to bring said racks into and out of gear with said register wheels; and slots in said frame for guiding said rod.

68. In an adding machine, the combination of a series of register wheels; transfer racks arranged to gear with said register wheels; a spring for moving said register wheels and racks, the one into gear with the other; means for moving said racks and wheels out of gear; and a trip for releasing the parts, whereby said spring is left free to move said racks and pinions into gear.

69. In an adding machine, the combination of a series of register wheels; transfer racks mounted on a rod and arranged to gear with said register wheels; a rock shaft having arms connected by links to said rod; and means for turning said rock shaft to move said racks into and out of gear with said register wheels.

70. In an adding machine, the combination with the register wheels, of spring actuated transfer slides for said register wheels; a rod for restoring said transfer slides; a rock shaft having arms connected by links to said rod; and operating mechanism for rocking said rock shaft.

71. In an adding machine, the combination with the register wheels, of spring actuated transfer slides for said register wheels; a rod for restoring said slides; a rock shaft having arms connected by links to said rod; operating mechanism for turning said rock shaft to restore said slides; a trip for freeing said rock shaft from said operating mechanism; and a spring for restoring said rock shaft.

72. In an adding machine, the combination with the register wheels, of transfer racks movable into and out of gear with said register wheels; operating mechanism for moving said transfer racks out of gear with said register wheels; a trip for freeing said transfer racks from said operating mechanism; and a spring for returning said transfer racks into gear with said register wheels.

73. In an adding machine, the combination with the register wheels, of transfer slides for said register wheels; a frame for restoring said transfer slides; operating mechanism for operating said frame to restore said slides; a trip to free said frame from said operating mechanism; and a spring for restoring said frame.

74. In an adding machine, the combination with the register wheels, of spring actuated transfer devices for said register wheels; a movable frame for restoring said transfer devices; operating mechanism for moving said frame to restore said transfer devices, a trip for freeing said frame from said operating mechanism; and a spring for restoring said frame.

75. In an adding machine, the combination with the register wheels, of transfer slides for said register wheels; pivoted transfer racks arranged to gear with said register wheels and connected to said slides by pin and slot connection, whereby said transfer racks have a motion into and out of gear with said register wheels without becoming disconnected from said transfer slides; means for moving said transfer racks into and out of gear with said register wheels; and means for operating said transfer slides.

76. In an adding machine, the combination with the register wheels, of transfer devices for said register wheels; means for disconnecting said transfer devices and register wheels; means for restoring said transfer devices, while so disconnected; an operating member 453; means whereby said operating member operates said disconnecting means; a lost motion connection between said operating member and said restoring means whereby said restoring means is operated by said operating member after said transfer devices and said register wheels are disconnected; a trip for freeing said disconnecting means from said operating member; a spring for restoring the connection between said transfer devices and said register wheels; means for freeing said restoring means from said operating member after connection between said transfer devices and said register wheels has been restored; and a spring for returning said restoring means to normal position.

77. The combination with a series of register wheels, of operating devices therefor; a set of cams for operating said operating devices to add numbers; a second set of cams for operating said operating devices to reset the same without affecting the register wheels; a pinion for each of said sets of cams; an operating handle; a rack operated by said handle; and means for bringing said rack into engagement with one or the other of said pinions.

78. The combination with a series of register wheels, of a series of setting up devices; two cams; means for resetting said setting up devices, said means having two followers one for each of said cams, one of said cams being timed to actuate said resetting means to add numbers, and the other of said cams being timed to actuate said resetting means to set the mechanism to zero; an operating handle; and means for connecting said operating handle to one or the other of said cams.

79. The combination of a series of register wheels, a series of racks for operating said register wheels, means for operating said racks in accordance with numbers, means for bringing said racks and register wheels into and out of coöperative relation, a handle for resetting said racks, and means for changing the portion of the stroke of the handle at which said racks are reset.

80. The combination of a series of register wheels and operating devices therefor, an operating handle, a set of cams and connections for operating said operating devices to add numbers, another set of cams for operating said operating devices to reset the same without affecting the register wheels, and means for connecting said handle to one or another of said sets of cams.

81. The combination of a series of register wheels; a series of setting up racks mounted in a carriage; means for imparting a step-by-step movement to said carriage; means for setting up said racks one at a time in accordance with the digits of numbers to be added; an operating handle; means operated by said handle for resetting said racks to zero position; means operated by said handle for returning said carriage to initial position; and means for reversing the order of succession of the operations of returning the carriage and resetting the racks.

82. In an adding machine, the combination with registering mechanism, of an operating handle, means for resetting said mechanism and a resetting key mounted on said operating handle and controlling said resetting means.

83. In an adding machine, the combination of the operating shaft 79; the pinions 389 and 390; the register wheels and the controlling devices therefor; means controlled by said pinion 389 for adding numbers on the register wheels; means controlled by said pinion 390 for resetting the parts; gear 371, slidably mounted on said operating shaft 79; and means for moving said gear 371 into mesh with one or the other of said pinions.

84. In an adding machine, the combination of register wheels; setting-up devices; means for setting up said setting-up devices in accordance with numbers; an operating handle; connections whereby, when said handle is operated, the number which has been set up on the setting-up devices is added on the register wheels; a hand operated member carried by said handle; and means controlled by said hand operated member for resetting said setting-up devices without operating the register wheels when the handle is operated.

85. In an adding machine, the combination of register wheels; numeral keys and setting-up devices controlled thereby; an operating handle for operating said register wheels in accordance with numbers determined by the depression of the keys; a hand operated member carried by said operating handle; and means controlled by said hand operated member for causing the operating handle, when operated, to reset said setting-up devices without affecting the total indicated by said register wheels.

86. In an adding machine, the combination with register wheels and controlling devices therefor, of an operating handle; a hand operated member carried by said operating handle; and an operating mechanism which is operated by said handle and controlled by said hand operated member, and which, when operated, actuates the register wheels to add or reset said controlling devices without adding, according to the position of said hand operated member.

87. In an adding machine, the combination with register wheels and setting-up mechanism, of operating mechanism including cams for operating said setting-up mechanism and register wheels to add numbers and to restore said setting-up mechanism to normal position; a pinion for said cams; cams for restoring said setting-up mechanism to normal position without operating said register wheels to add; a second pinion for said cams; one of said pinions and its cams being sleeved on the shaft of the other; and means for operating one or the other of said pinions.

88. In an adding machine, the combination with register wheels and setting-up mechanism, of operating mechanism including cams for operating said register wheels and setting-up mechanism to add numbers and to restore said setting-up mechanism to normal position; a pinion for said cams; cams for restoring said setting-up mechanism without operating said register wheels to add numbers; a second pinion for said cams; one of said pinions and its cams being sleeved on the shaft of the other; a gear 371; means for bringing said gear into position to operate one or the other of said pinions; and means for operating said gear.

89. In an adding machine, the combination with register wheels and setting-up mechanism, of operating mechanism including a pinion and connections for operating said setting up mechanism and register wheels to add numbers and to restore said wheels to add numbers to normal position; a setting-up mechanism and connections for restoring second pinion and connections for restoring said setting-up mechanism without operating said register wheels to add numbers; means for operating one or the other of said pinions; and means for locking one of said pinions when the other is operated.

90. In an adding machine, the combination with register wheels, of operating mechanism including cams and cam operated members 410 and 440; springs for pressing said cam operated members toward said cams; and means whereby said cam operated member 410, when operated, holds said cam operated member 440 in operated position.

91. In a calculating machine, the combination of a series of registering elements; locking devices for said registering elements; a series of setting-up elements; an operating handle having a positive and a return stroke; and means operated by said operating handle on its positive stroke for unlocking said registering elements, operating said registering elements in accordance with the number set up on said setting-up devices, and locking said registering elements.

92. In a calculating machine, the combination of a series of registering elements; a series of spring actuated transfer devices; a series of setting-up elements; an operating handle having a positive and a return stroke; and means operated by said operating handle on the positive stroke thereof for disconnecting said registering elements and transfer devices, resetting said transfer devices, operating said registering elements in accordance with the number set up on said setting-up elements, restoring the connection between said registering elements and said transfer devices, disconnecting said registering elements and said setting-up devices, and releasing said transfer devices.

93. In a calculating mechanism, the combination of a series of setting-up members; a series of detents for said setting-up members; a frame upon which said detents are movably mounted; springs connecting said detents and said frame; means for moving any of said detents independently of the others; and means for moving said frame so as to move all of said detents at once.

94. In a calculating mechanism, the combination of a series of setting-up members; a series of detents for said setting-up members; a frame upon which said detents are movably mounted; springs connecting said detents and said frame; means for limiting the motion of said detents relatively to said frame under the impulse of said springs;

means for moving any of said detents independently of the others; and means for moving said frame so as to move all of said detents at once.

95. In a calculating machine, the combination of a series of setting-up members; a series of detents for said setting-up members; a rock-frame upon which said detents are pivotally mounted; springs connecting said detents and said rock-frame; means for limiting the motion of said detents relative to said rock-frame under the impulse of said springs; means for oscillating any of said detents against the tension of its spring; and means for rocking said rock frame so as to oscillate all of said detents together.

96. In a calculating machine, the combination of a series of setting-up members; motor means for each of said setting-up members; a series of detents for said setting-up members; a rock shaft on which said detents are pivotally mounted; springs connected to said detents and said rock shaft; means for limiting the motion of said detents relative to said rock shaft; means for moving any of said detents against the tension of its spring; and means for rocking said rock shaft to move all of said detents.

97. In a calculating machine, the combination of a series of register wheels, a series of setting-up elements adapted to coöperate with said register wheels, a carriage in which one of said coöperating parts is mounted; means for moving said carriage to bring a greater or less number of setting-up elements and register wheels into coöperative relation; motor means and a detent for each of said setting-up elements; means for moving any of said detents independently of the others; and means operative only when the carriage is in such position that all of said register wheels are in coöperative relation with setting-up elements for moving all of said detents together.

98. In a calculating machine, the combination of a series of register wheels; a series of setting-up elements, each independently motor driven; means for bringing said setting-up elements and said register wheels into gear; a series of detents for said register wheels; a series of detents for holding said setting-up elements in any one of a plurality of positions; and means for moving both of said series of detents to permit said register wheels to be turned by said setting-up elements.

99. In a calculating machine, the combination of a series of register wheels; a series of setting-up elements, each independently motor driven; means for bringing said setting-up elements and said register wheels into gear; a series of detents for said register wheels; a series of detents for said setting-up elements; and means operative only when all of said register wheels are in gear with setting up elements for moving both of said series of detents to permit said register wheels to be turned by said setting-up elements.

100. In a calculating machine, the combination of a series of register wheels; means for turning said register wheels; a series of transfer levers, and zero setting mechanism including means for moving said transfer levers to take up lost motion.

101. In a calculating machine, the combination of a series of register wheels; means for turning said register wheels in one direction in accordance with numbers to be added and in the other direction to set said wheels to zero; transfer devices coöperating with said register wheels to transfer from one wheel to another in the operation of addition and to arrest said wheels in the operation of setting them to zero; and zero setting mechanism including means for moving said transfer devices relative to said register wheels to take up lost motion.

102. In a calculating machine, the combination of a series of register wheels; spring actuated transfer devices for said register wheels; means for moving said transfer devices out of coöperative relation with said register wheels and for resetting said transfer devices in the operation of addition; and a hand operated member 497, for moving said transfer devices out of coöperative relation with the register wheels and resetting said transfer devices in the operation of setting said register wheels to zero.

103. In a calculating machine, the combination with a series of registering elements, of a carriage; means mounted in said carriage for operating said registering elements; a step-by-step mechanism for said carriage; and a zero setting mechanism including a carriage releasing device.

104. In a calculating machine, the combination with a series of register wheels, of a carriage; a series of motor driven setting up elements mounted in said carriage; a step-by-step device for bringing said setting-up elements step-by-step into coöperative relation with said register wheels; means for operating said setting-up elements to add on said register wheels the number set up on said setting-up elements; and zero setting mechanism for said register wheels, said zero setting mechanism including a carriage release device.

105. In a calculating machine, the combination with a series of register wheels, of a carriage; a series of motor actuated setting-up elements mounted in said carriage; detents for said setting-up elements; a step-by-step feed device for said carriage; a single group of keys; key controlled means for releasing said detents one at a time and for actuating said step-by-step device to bring one after another of said setting-up elements under the control of the keys and to bring one after another of said setting-up elements into coöperation with the register wheels; means for actuating said setting-up elements to add on said register wheels the numbers set up on said setting-up elements; zero setting mechanism for said register wheels, said zero setting mechanism including a carriage release; and means operative only when the carriage is in such position that all of the register wheels are in coöperative relation with setting-up elements, for operating all of said detents.

106. The combination of a series of register wheels; a series of transfer devices for said register wheels; a series of spring actuated setting-up devices; means for controlling said setting up devices and said transfer devices in the operation of adding on the register wheels numbers set up on said setting up devices; and zero setting mechanism including a hand-operated member for controlling said transfer devices and releasing said spring actuated setting-up devices in the operation of setting said register wheels to zero.

107. In a calculating machine, the combination of a series of register wheels; a carriage; a series of setting-up devices mounted on said carriage; means for setting up said setting up devices one at a time, in accordance with members to be added; a step-by-step device for said carriage, whereby a plurality of said setting-up devices are brought one at a time into coöperative relation with said register wheels; and zero setting mechanism including means whereby said setting-up devices automatically turn said register wheels to zero.

108. In an adding machine, the combination with the numeral keys and the adding mechanism controlled thereby, of a universal bar, means whereby said universal bar is operated by the depression of any key, said means including a snap-off device whereby said universal bar is disconnected from an operated key and is permitted to return to normal position irrespective of the further motion of the key.

109. In an adding machine, the combination with the numeral keys, of key operated slides one for each key, said slides controlling said adding mechanism, and connecttions between said keys and slides including a latch pivoted to each of said slides and a key operated member which coöperates with said latch to operate said slide during a part of the stroke of the key but which escapes from said latch at a predetermined point in the stroke of the key, thus permitting said slide to return to normal position irrespective of the further motion of the key; and a universal bar operated by any of said slides.

110. In an adding and writing machine, the combination with the key levers and the key controlled printing means, of adding mechanism; a series of slides 105 for controlling said adding mechanism; a series of rock-shafts 93; arms 110 on said rock shafts; latches 107 on said slides, said latches coöperating with said arms, arms 95 on said rock shafts; and links 96 pivoted at one end to said arms 95 and at the other end to said key levers.

111. In an adding machine, the combination of a carriage; a series of differentially movable elements mounted in said carriage and each spring impelled; a group of keys; and means controlled by said keys for imparting a step-by-step feed to said carriage and for releasing said differentially movable elements one by one and arresting them in positions corresponding to the respective values of the keys operated.

112. In an adding machine, the combination of a carriage; a series of differentially movable elements mounted in said carriage; spring means for operating said differentially movable elements; a group of keys; and means controlled by said keys for imparting a step-by-step feed to said carriage, releasing said differentially movable elements one at a time to be actuated by said spring driving means and arresting each of said differentially movable elements in positions corresponding to the numerical values of the respective keys operated.

113. In an adding machine, the combination of a carriage; a series of spring impelled setting up elements mounted in said carriage; a group of keys common to said setting up elements; means operated by said keys for releasing said setting up elements one at a time and arresting them in positions corresponding to the respective values of the keys operated; and a register operated by said setting up elements in accordance with the number set up thereon.

114. In an adding machine, the combination of a carriage; a series of spring impelled setting up elements mounted in said carriage; a group of keys common to said setting up elements; means operated by said keys for releasing said setting up elements one at a time and arresting them in positions corresponding to the respective values of the keys operated; means for restoring said setting up elements to normal position; and a register operated by said setting up elements when they are restored to normal position.

115. In a combined typewriting and adding machine, the combination of a carriage for the typewriting machine, a carriage for the adding machine, and a tabulator for bringing the typewriter carriage to any desired point in the adding column without affecting the adding machine carriage.

116. In a combined typewriting and adding machine, the combination of a carriage for the typewriter mechanism, a carriage for the adding mechanism, a step-by-step feed device for said adding mechanism carriage, a series of keys including numeral keys, a tabulator key adapted to position the typewriter carriage, and means controlled by said typewriter carriage for connecting said step-by-step feed device with or disconnecting it from said numeral keys.

117. In a typewriting and adding machine, the combination of a carriage for the typewriter mechanism, a step-by-step feed device for said carriage, a carriage for the adding mechanism, a step-by-step feed device for the latter carriage, a tabulator for positioning the typewriter carriage without affecting the adding machine carriage, a series of keys including numeral keys, means whereby the step-by-step feed device for the adding machine carriage is brought under the control of said numeral keys during certain predetermined letter space positions of the typewriter carriage, and a series of setting up elements mounted in said adding machine carriage and controlled by said numeral keys, the construction being such that the setting up element of highest denomination is always first operated by said numeral keys so that the position of the typewriter carriage determined by said tabulator key determines the denominational value of said first setting up element.

118. In an adding machine, the combination of a series of numeral keys, a series of movable elements each carrying a stop, a universal bar controlled by said movable elements, and power driven adding mechanism released by said universal bar and arrested by said stops.

119. In a combined typewriting and adding machine, the combination with keys including numeral keys, and types actuated by said keys, of a series of indicators, a series of setting up devices controlling said indicators, a motor for each of said setting up devices, key controlled means for controlling the operation of said setting up devices by their motors, a register, and means for adding on said register the numbers set up on said setting up devices and shown by said indicator.

120. In a combined typewriting and adding machine, the combination with keys including numeral keys and types actuated by said keys, of a series of registering elements, a series of setting up devices, a motor for each of said setting up devices, key controlled means for controlling the operation of said setting up devices by their motors, and means for operating said registering elements to add thereon the numbers set up on said setting up devices.

121. In a combined typewriting and adding machine, the combination with keys including numeral keys and types actuated by said keys, of a carriage, a series of setting up devices mounted on said carriage, a motor for each of said setting up devices, key controlled means for controlling the operation of said setting up devices by their motors, means for imparting a step-by-step movement to said carriage to bring said setting up devices one after another into coöperative relation with said key controlled devices, and means for operating said registering elements in accordance with the numbers set up on said setting up devices.

122. In a combined typewriting and adding machine, the combination with keys including numeral keys and types actuated by said keys, of a series of differentially movable elements, a motor spring for each of said differentially movable elements, means controlled by said numeral keys for controlling the movement of said elements by their motor spring, and means for bringing said differentially movable elements one after another into coöperative relation with said key controlled means.

123. In an adding machine, the combination of a series of register wheels, a series of transfer racks normally in gear with said register wheels, whereby said transfer racks serve as locks for said register wheels, means for moving said transfer racks bodily into and out of gear with said register wheels, actuating devices for said register wheels normally out of gear therewith, and means for bringing said actuating devices into and out of gear with said register wheels.

124. In an adding machine, the combination of a register wheel, a transfer rack movable into and out of gear with said register wheel, and a reciprocatory actuating device for said transfer rack having pin and slot connection with said rack, whereby said rack may be moved into and out of gear with the register wheel without disconnecting it from said actuating device.

125. In an adding machine, the combination of a series of register wheels; a series of setting up devices; means for moving said setting up devices differentially in accordance with numbers to be added, means for bringing said register wheels and said setting-up devices into gear; an operating mechanism adapted to cause said setting up devices to operate said register wheels; and a correcting key adapted to change the connections in said operating mechanism, so that said operating mechanism will first move said setting up devices out of gear with said register wheels and then will restore said setting up devices to normal position without operating said register wheels.

126. In an adding machine, the combination of a series of register wheels; a series of setting up devices adapted to be moved differentially in accordance with numbers to be added; means for bringing said setting up devices into operative connection with said register wheels; an operating mechanism adapted to restore said setting up devices to normal position while they are in operative connection with said register wheels; and a correcting device for causing said operating mechanism first to move said setting-up devices out of operative connection with said register wheels and then to restore said setting up devices to normal position when they are out of operative connection with said register wheels.

127. In an adding machine, the combination of a series of register wheels; a series of setting up devices; means for moving said setting up devices differentially in accordance with numbers to be added; a set of cams and connections for resetting said setting up devices to add on the register wheels the number set up on said setting up devices; a second set of cams for resetting said setting up devices without operating said register wheels; and means for operating one or the other of said sets of cams.

128. In a computing mechanism, a series of denominational members, operating means therefor, means for changing the denominational relation of the members and their operating means, carrying mechanism associated with the members, and selective mechanism variable to determine whether or not certain members will be operative by the operating means when the denominational relation of the parts is such as to permit the operation of said members.

129. In a computing mechanism, a unit including a series of denominational members, a second unit including operating means for the members, one of said units being relatively movable to change the denominational relation of the units, and means for determining whether or not certain of said members will be operated by the operating means when the relation of the units is such as to permit the operation of said members.

130. In a computing mechanism, the combination of a series of denominational members, means for controlling said denominational members one at a time, a carriage movable to cause the establishment of a coöperative relation between said controlling means and a selected member, and selecting means for rendering any desired number of members operative, the non-selected members being inoperative in all positions of the carriage.

131. The combination with a platen and printing mechanism, relatively movable, of computing mechanism including a series of denominational members, controlling means common to said denominational members, and means for establishing a coöperative relation between the controlling means and such only of the denominational members as correspond to the denominational positions of the column to be computed, the remaining members being inoperative when the relation of the members and controlling means would otherwise permit said remaining members to be operative.

132. In an adding machine, the combination with the numeral keys and the adding mechanism controlled thereby, of a universal bar, means whereby said universal bar is operated by the depression of any key, and means for returning said universal bar to normal position during the down-stroke of the key.

133. In a typewriting and adding machine, the combination with typewriting mechanism including printing instrumentalities and printing keys including numeral and other keys, of adding mechanism including a universal bar operated by any of the numeral keys, and means for returning said universal bar to normal position on the down-stroke of a key.

134. In a typewriting and adding machine, the combination with typewriting mechanism including printing instrumentalities and printing keys including numeral keys and other keys, of adding mechanism including a universal bar operated by any of said numeral keys, and means for freeing said universal bar from the operated key before said key completes its stroke.

135. In a typewriting and adding machine, the combination with typewriting mechanism including printing instrumentalities and printing keys including numeral keys and other keys, of adding mechanism comprising a series of levers, one for each of said numeral keys, a universal bar operated by any of said levers, and means for freeing said universal bar from an operated numeral key on the down-stroke of said key.

Signed at the borough of Manhattan, city of New York, in the county of New York, and State of New York, this 14th day of March, A. D. 1904.

MARQUIS HARTWELL LOCKWOOD.

Witnesses:
K. V. DONOVAN,
M. F. HANNWEBER.